(12) United States Patent
Kim et al.

(10) Patent No.: US 8,526,542 B2
(45) Date of Patent: Sep. 3, 2013

(54) DIVERSITY RECEIVER FOR PROCESSING VSB SIGNAL

(75) Inventors: DoHan Kim, Suwon-si (KR); Sergey Zhidkov, Suwon-si (KR); Beom kon Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 207 days.

(21) Appl. No.: 13/093,482

(22) Filed: Apr. 25, 2011

(65) Prior Publication Data

US 2011/0261873 A1 Oct. 27, 2011

(30) Foreign Application Priority Data

Apr. 26, 2010 (KR) .................. 10-2010-0038632

(51) Int. Cl.
*H03D 1/24* (2006.01)
(52) U.S. Cl.
USPC ........... 375/321; 375/326; 375/347; 375/316; 375/267; 375/299; 375/270; 375/301
(58) Field of Classification Search
USPC ................ 375/229, 321, 326, 347, 316, 267, 375/299, 270, 301; 714/784, 786
See application file for complete search history.

(56) References Cited

U.S. PATENT DOCUMENTS

| 7,403,579 | B2 | 7/2008 | Jaffe et al. | |
| 7,568,147 | B2* | 7/2009 | Eidson et al. | 714/786 |
| 2003/0058967 | A1* | 3/2003 | Lin et al. | 375/327 |
| 2006/0098728 | A1 | 5/2006 | Park et al. | |
| 2009/0086808 | A1 | 4/2009 | Liu et al. | |
| 2010/0322362 | A1* | 12/2010 | Kusano | 375/347 |

FOREIGN PATENT DOCUMENTS

| CA | 2 516 249 A1 | 10/2004 |
| CN | 100479515 C | 4/2009 |
| KR | 10-2004-0073345 A | 8/1920 |
| MX | PA 05008516 A | 5/2006 |
| WO | WO 2004/086762 A1 | 10/2004 |
| WO | WO2009054399 * | 4/2009 |

OTHER PUBLICATIONS

Furht, B., et al., "Handbook of Mobile Broadcasting: DVB-H, DMB, ISDB-T, and Mediaflo," *CRC Press*, 2008, p. 525.

* cited by examiner

*Primary Examiner* — Dhaval Patel
(74) *Attorney, Agent, or Firm* — Lee & Morse, P.C.

(57) ABSTRACT

A diversity receiver configured to receive digital signals, including a first modulator configured to receive a first signal and modulate the first signal to first data, a second modulator configured to receive a second signal and modulate the second signal to second data, a path aligner configured to detect starting points of the first data and the second data and generate a control signal for synchronizing the first data and the second data, and an equalizer/decoder configured to synchronize the first and second data and to generate a signal to noise ratio and an equalizer output by a recursive equalization operation for the diversity signals thus synchronized.

16 Claims, 12 Drawing Sheets

DIVERSITY RECEIVER FOR PROCESSING VSB SIGNAL

CROSS-REFERENCE TO RELATED APPLICATIONS

This application claims priority under 35 U.S.C. §119 to Korean Patent Application No. 10-2010-0038632, filed on Apr. 26, 2010, in the Korean Intellectual Property Office, and entitled: "Diversity Receiver for Processing VSB Signal," which is incorporated by reference herein in its entirety.

BACKGROUND

1. Field

Embodiments relate to a digital broadcasting system, and more particularly, to a diversity receiver for processing VSB (vestigial sideband) signal.

2. Description of the Related Art

An analog broadcasting system is rapidly being replaced by a digital broadcasting system. In the near future, it is expected that the digital broadcasting system will fully replace the existing analog broadcasting system.

An Inter-Symbol Interference (ISI) of channel is a major problem encountered in theory and practice of a digital broadcasting or a digital communication system. A variety of channel equalization techniques have been developed for removing the Inter-Symbol Interference (ISI). Channel equalization techniques include MLSE (Maximum-Likelihood Sequence Estimation), LE (Linear Equalization) and DFE (Decision-Feedback Equalization).

In a digital broadcasting system, a variety of channel code and error correction techniques are used to correct an error generated by noise. Especially, in a digital TV broadcasting system using an ATSC 8-VSB method, Reed-Solomon code related to a Trellis coded Modulation (hereinafter, referred to as TCM) is used.

SUMMARY

One or more embodiments may provide a digital TV receiver that may increase reliability of received data in multi-path and time-varying channel environment relative to comparable conventional devices.

One or more embodiments may provide a diversity receiver receiving VSB signals including a high performance equalizer module that may increase reliability of received data in a multi-path and time-varying channel environment relative to comparable conventional devices.

One or more embodiments may provide a diversity receiver configured to receive VSB (vestigial sideband) signals, including a first modulator configured to receive a first VSB signal and modulating the first VSB signal to first VSB data, a second modulator configured to receive a second VSB signal and modulating the second VSB signal to second VSB data, a path aligner configured to detect starting points of the first VSB data and the second VSB data and synchronizing the first VSB data and the second VSB data, and a dual channel equalizer/decoder configured to repeatedly perform an equalization process for a selected section, the equalization process including filtering each of the first and second VSB data synchronized in a feed-forward manner, mixing the first and second filtered VSB data, and filtering the mixed result in a decision feedback manner.

The dual channel equalizer/decoder may include a TCM (trellis code modulation) decoder configured to decode a data stream generated by the equalization process into a Trellis code, a de-interleaver configured to de-interleave an output of the TCM decoder, and a Reed-Solomon decoder configured to process the de-interleaved data stream by a Reed-Solomon algorithm and output the processed data stream as a transmit stream.

The dual channel equalizer/decoder may include a recursive equalizer that is configured to filter each of the first VSB data and the second VSB data by a feed-forward method, mix the first filtered VSB data and the second filtered VSB data, and filter the mixed result by a feedback method, the recursive equalizer using the output of the TCM decoder as determination values for the feed-forward filtering and the feedback filtering.

The recursive equalizer may include a first input buffer configured to store the first VSB data and output the first VSB data in a section unit, a second input buffer configured to store the second VSB data and output the second VSB data in the section unit, a first feed-forward filter configured to filter data of the section unit from the first input buffer according to an equalizer coefficient that is repeatedly updated, a second feed-forward filter configured to filter data of the section unit from the second input buffer according to the equalizer coefficient that is repeatedly updated, a first mixer configured to mix outputs of the first feed-forward filter and the second feed-forward filter, a feedback filter configured to filter the mixed signal by referring to a decision from the TCM decoder, and a coefficient adapting unit configured to adaptively update each equalizer coefficient of the first feed-forward filter, the second feed-forward filter, and the feedback filter by referring to the decision from the TCM decoder.

The recursive equalizer further may include an output buffer that is configured to temporarily store sections finally generated by a recursive filtering of the section, rearrange the temporarily stored sections to a data stream and provide the rearranged sections to the TCM decoder or the de-interleaver.

The dual channel equalizer/decoder may include a first dual channel equalizer/decoder configured to perform a first recursive equalization operation, a first TCM decoding, and a first Reed-Solomon decoding sequentially for each of the first VSB data and the second VSB data and to output a first Dibit as a result, and a second dual channel equalizer/decoder configured to perform a second recursive equalization operation, a second TCM decoding, and a second Reed-Solomon decoding for each of the first VSB data and the second VSB data and to output a transmit stream as a result wherein the first Dibit may be provided as a reliability information for a soft decision operation of the second TCM decoding operation.

The first dual channel equalizer/decoder may include a first recursive equalizer configured to perform a first recursive equalization operation for each of the first VSB data and the second VSB data, a first TCM decoder configured to decode an output of the recursive equalizer by a Trellis code algorithm, a first de-interleaver configured to de-interleave an output of the first TCM decoder, a first Reed-Solomon decoder configured to perform a first Reed-Solomon decoding for an output of the first de-interleaver, a first interleaver configured to interleave an output of the first Reed-Solomon decoder, and a Dibit generator configured to convert a byte output of the first interleaver to the Dibit.

The first recursive equalizer may include a first input buffer configured to store the first VSB data and to output the first VSB data in a section unit, a second input buffer configured to store the second VSB data and to output the second VSB data in the section unit, a first feed-forward filter configured to filter data of the section unit from the first input buffer according to an equalizer coefficient that is repeatedly updated, a second feed-forward filter configured to filter data of the section unit from the second input buffer according to the equalizer coefficient that is repeatedly updated, a first mixer configured to mix outputs of the first feed-forward filter and the second feed-forward filter, a feedback filter configured to filter the mixed signal by referring to a decision value from the TCM decoder, and a coefficient adapting unit configured to adaptively updating each equalizer coefficient of the first feed-forward filter, the second feed-forward filter, and the feedback filter by referring to the decision from the TCM decoder.

The feedback filter may be configured with a decision feedback equalizer and a path metric or a decision value from the TCM decoder is fed back to the feedback filter.

The second dual channel equalizer/decoder may include a second recursive equalizer configured to perform a second recursive equalization operation for each of the first VSB data and the second VSB data, a second TCM decoder configured to decode an output of the second recursive equalizer by a Trellis code algorithm by using the first Dibit as the reliability information, a second de-interleaver configured to de-interleave an output of the second TCM decoder, and a second Reed-Solomon decoder configured to perform the second Reed-Solomon decoding for an output of the second de-interleaver.

The diversity receiver may include a third dual channel equalizer/decoder between the first dual channel equalizer/decoder and the second dual channel equalizer/decoder and configured to generate a third Dibit by performing a third recursive equalization operation for each of the first VSB data and the second VSB data, a third TCM decoding using the first Dibit as the reliability information, and a third Reed-Solomon decoding successively and to provide the third Dibit to the second dual channel equalizer/decoder.

The diversity receiver may include a plurality of the dual channel equalizer/decoders between the first dual channel equalizer/decoder and the second dual channel equalizer/decoder and configured to respectively perform a recursive equalization operation for each of the first VSB data and the second VSB data, a TCM decoding, and Reed-Solomon decoding successively.

Each of the plurality of dual channel equalizer/decoder may be configured to provide a Dibit generated by Reed-Solomon decoding and a delayed receiving symbol to an adjacent following dual channel equalizer/decoder.

One or more embodiments may provide a diversity receiver configured to receive VSB (vestigial sideband) signals, including a first equalizer/decoder configured to synchronize first diversity signals and generate a first signal to noise ratio and a first equalizer output by a recursive equalization operation in a section unit for the first diversity signals thus synchronized, and a second equalizer/decoder configured to synchronize second diversity signals, generate a second signal to noise ratio and a second equalizer output by a recursive equalization operation in a section unit for the second diversity signals thus synchronized, and mix the first equalizer output and the second equalizer output by referring to the first signal to noise ratio and the second signal to noise ratio, wherein the first equalizer/decoder and the second equalizer/decoder are formed on different chips.

The second equalizer/decoder may include a recursive equalizer configured to generate the second signal to noise ratio and the second equalizer output by processing the second diversity signals according to a recursive equalization operation procedure, and an adaptive gain calculator configured to calculate a gain or a weight for the first equalizer output and the second equalizer output from the first signal to noise ratio and the second signal to noise ratio.

The second equalizer/decoder may further include a main decoder configured to generate a transmit stream by combining the first equalizer output and the second equalizer output by referring to the gain or the weight for the first equalizer output and the second equalizer output.

The second equalizer/decoder may further include a first amplifier configured to apply optimum gain to the first equalizer output, a second amplifier configured to apply optimum gain to the second equalizer output, a mixer configured to add the first equalizer output from the first amplifier and the second equalizer output from the second amplifier, and a main decoder configured to receive a result of the mixer and generate a transmit stream.

The main decoder may include a TCM decoder, a de-interleaver, and a Reed-Solomon decoder for processing the result of the mixer and generate the transmit stream.

One or more embodiments may provide a diversity receiver configured to receive digital signals, including a first modulator configured to receive a first signal and modulate the first signal to first data, a second modulator configured to receive a second signal and modulate the second signal to second data, a path aligner configured to detect starting points of the first data and the second data and generate a control signal for synchronizing the first data and the second data, and an equalizer/decoder configured to synchronize the first and second data and to generate a signal to noise ratio and an equalizer output by a recursive equalization operation for the diversity signals thus synchronized.

The equalizer/decoder may include a first-stage multi-channel equalizer/decoder configured to perform a first recursive equalization operation, a first TCM decoding, and a first Reed-Solomon decoding sequentially for each of the first data and the second data and to output a first result, and a last-stage multi-channel equalizer/decoder configured to perform a last-stage recursive equalization operation, a last-stage TCM decoding, and a last-stage Reed-Solomon decoding for each of the first data and the second data and to output a transmit stream as a result, wherein the first result is provided as a reliability information for a soft decision operation of the last-stage TCM decoding operation.

BRIEF DESCRIPTION OF THE DRAWINGS

One or more features will become more apparent to those of ordinary skill in the art by describing in detail exemplary embodiments with reference to the attached drawings, in which.

DETAILED DESCRIPTION

Figure 1:
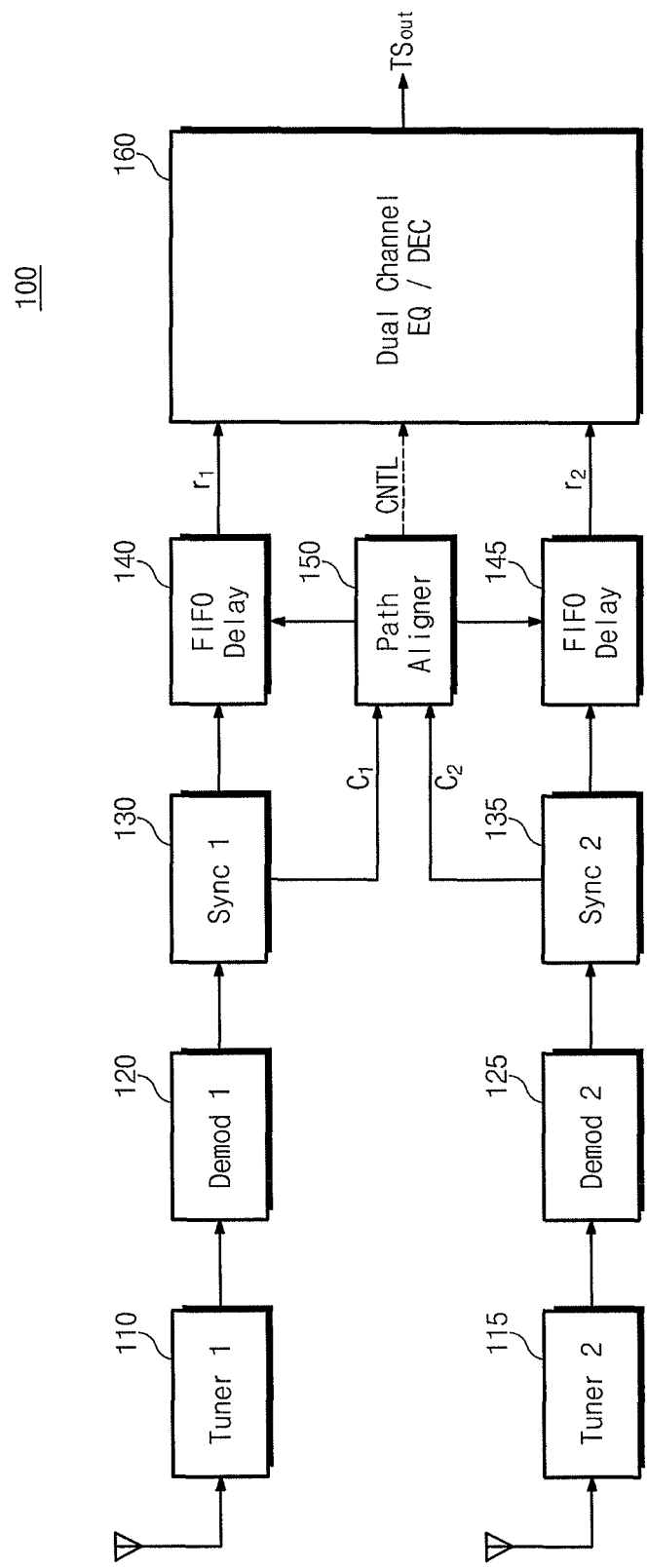
FIG. 1 illustrates a block diagram of an exemplary embodiment of a diversity receiver.

Korean Patent Application No. 10-2010-0038632, filed on Apr. 26, 2010, in the Korean Intellectual Property Office, and entitled: "Diversity Receiver for Processing VSB Signal," is incorporated by reference herein in its entirety.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. In the figures, the dimensions of elements may be exaggerated for convenience of illustration. Like reference numerals refer to like elements throughout the specification.

Below, digital broadcasting systems with the ATSC 8-VSB will be utilized as an example to describe characteristics and functions of the inventive concept. But, it is well understood that the inventive concept is not limited to this disclosure. Terms used in the following embodiments may be used in the context of generally known meanings in related technical fields. For example, the term "at least one" includes one or more in number, and may be used to describe an element that is one or more in number. It will be further understood, e.g., that, although the terms first, second, etc. may be used herein to describe various elements, these elements should not be limited by these terms. These terms are only used to distinguish one element from another. Thus, a first element discussed below could be termed a second element without departing from the teachings of this disclosure.

FIG. 1 illustrates a block diagram of an exemplary embodiment of a diversity receiver 100.

Referring to FIG. 1, the diversity receiver 100 may include first and second tuners 110, 115, first and second demodulators 120, 125, first and second synchronization units 130 and 135, first and second first-in, first-out (FIFO) delays 140, 145, path aligner 150 and dual channel equalizer/decoder 160.

The first and second tuners 110, 115 may down-convert RF signals from a diversity antenna to a baseband. When mixed with an oscillation frequency generated by a local oscillator, an RF signal of carrier band may be down-converted to a middle frequency band. The first and second tuners 110, 115 may convert a received signal of a selected band to a fixed intermediate frequency (IF) signal and may provide the fixed intermediate frequency (IF) signal to the first and second demodulators 120, 125, respectively.

The first and second demodulators 120, 125 may convert a VSB signal, which may be down-converted to an intermediate frequency by the first and second tuners 110, 115, to a symbol sequence. The first and second demodulators 120, 125 may respectively include an analog-digital converter (A/D Converter (ADC), not shown). The analog-digital converter may convert the VSB signal into a digital signal. The first and second demodulators 120, 125 may output a digital signal as a symbol (or bit stream) corresponding to a channel modulation method of a transmitter (not shown). The first and second demodulators 120, 125 may perform a timing recovery operation of a carrier and symbol. Signals processed by the first and second demodulators 120, 125 may be provided to the first and second synchronization units 130, 135, respectively.

The first and second synchronization units 130, 135 may detect a starting point of a VSB data frame that is demodulated by the first and second demodulators 120, 125, respectively. The first and second synchronization units 130, 135 may provide information C1, C2 corresponding to a starting point of VSB data frames to the path aligner 150, respectively. The first and second synchronization units 130, 135 may provide demodulated VSB data to the first and second FIFO 140, 145, respectively.

The path aligner 150 may calculate a time difference based on the information C1, C2 corresponding to the starting points of the two VSB data. The path aligner 150 may control delay of first and second FIFOs 140, 145 based on the calculated time difference. The two irrelevant VSB data received through different channels may have a time offset relative to each other. The path aligner 150 may synchronize the signals by aligning the two VSB data.

The synchronized VSB data r1, r2 may be provided to the dual channel equalizer/decoder 160.

The dual channel equalizer/decoder 160 may perform adaptive equalization of the two VSB data r1, r2. More particularly, the dual channel equalizer/decoder 160 may filter the two VSB data r1, r2 using, e.g., two feed-forward filters (e.g., 162a, 162b of FIG. 2). The dual channel equalizer/decoder 160 may combine the filtered VSB data r1 and r2 and may filter the combined VSB data r1 and r2 using a single feedback filter (e.g., 164 of FIG. 2). The combined signal, which may be filtered, may be output as a transmit stream TS through, e.g., a TCM (Trellis-Coded Modulation) decoding, de-interleaving, and/or a Reed-Solomon (RS) decoding procedure. The dual channel equalizer/decoder 160 may perform high speed recursive equalization using, e.g., a feed-forward filter and a feedback filter.

In one or more embodiments, a plurality of VSB data, e.g., r1, r2 received by diversity reception method may be filtered by high-speed recursive equalization.

Figure 2:
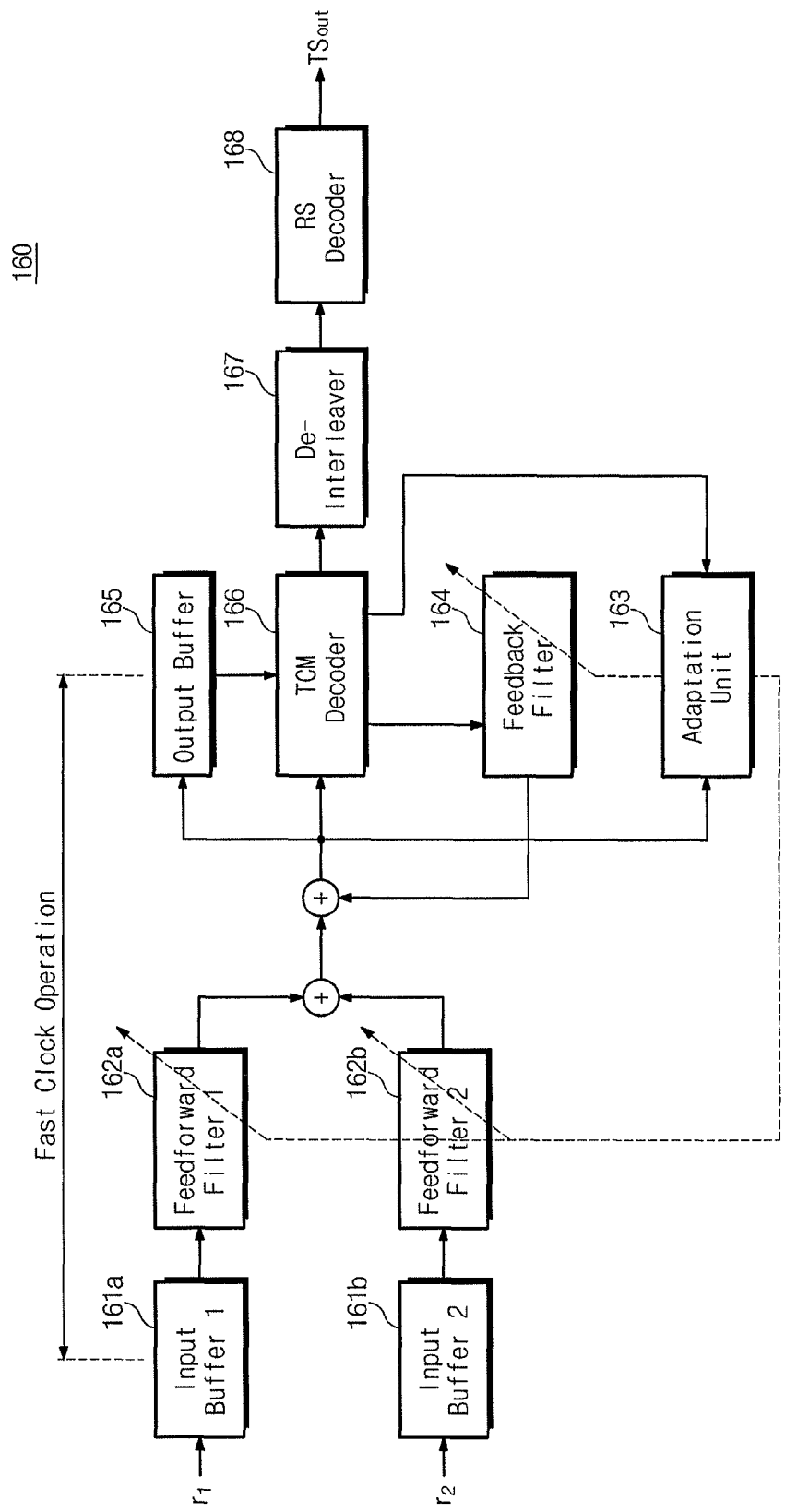
FIG. 2 illustrates a block diagram of an exemplary embodiment of a dual channel equalizer/decoder employable by the diversity receiver of FIG. 1.

FIG. 2 illustrates a block diagram of an exemplary embodiment of the dual channel equalizer/decoder 160 of FIG. 1. Referring to FIG. 2, the dual channel equalizer/decoder 160 may include first and second input buffers 161a, 161b, first and second feed-forward filters 162a, 162b, an adaptation unit 163, a feedback filter 164, output buffer 165, a TCM decoder 166, a de-interleaver 167, and a Reed-Solomon (RS) decoder 168. The first and second the input buffers 161a, 161b, the first and second feed-forward filters 162a, 162b, the adaptation unit 163, the feedback filter 164, and output buffer 165 may correspond to a recursive equalizer.

An exemplary processing procedure and processing device for a VSB data two-channel diversity receiver employing the dual channel equalizer/decoder 160 of FIG. 2 will be explained below in connection with FIGS. 1 and 2.

The first and second input buffers 161a, 161b may temporarily store the synchronized VSB data r1, r2, respectively. The VSB data r1, r2 stored in first and second input buffers 161a, 161b may be divided into respective units (hereinafter referred to as section) and be output respectively. The divided sections may be sequentially transmitted to the first and second feed-forward filters 162a, 162b, respectively. For recursive equalization, the first and second input buffers 161a, 161b may output the divided sections in synchronization with a high speed clock.

Each section transmitted to the first and second feed-forward filters 162a and 162b may be filtered one or more times by being synchronized with a high speed clock frequency. A repetition number of filtering operations by the first and second feed-forward filters 162a, 162b may be configured based on channel status and/or power consumption. For example, the first and second feed-forward filters 162a and 162b may perform recursive filtering two or more time when noise is severe. The first and second feed-forward filters 162a and 162b may be set to an equalizer coefficient calculated by the adaptation unit 163. More particularly, e.g., when recursive equalization is performed five times, each of equalizer coefficients of first and second feed-forward filters 162a, 162b may be updated five times to filter a section.

VSB data filtered by the first and second feed-forward filters 162a, 162b may be combined. The combined output of the first and second feed-forward filters 162a, 162b may be added to an output of the feedback filter 164. The feedback filter 164 may receive a value from the TCM decoder 166, based on a feedback determination by the TCM decoder 166, and the feedback filter 164 may filter the determined value. The feedback filter 164 may be driven by a decision feedback method that uses the determined value of TCM decoder 166. The adaptation unit 163 may calculate an equalizer coefficient of the first and second feed-forward filters 162a. 162b and the feedback filter 164 based on the determined value provided from TCM decoder 166.

In one or more embodiments, signal reliability may be increased by adding outputs of the first and second feed-forward filters 162a, 162b. In one or more embodiments, signal reliability of, e.g., a received signal, may be increased by using, e.g., the feedback filter 164, to correct errors. In one or more embodiments, an equalization process may be repeatedly performed by, e.g., the first and second feed-forward filters 162a, 162b and the feedback filter 164, and a more accurate equalizer coefficient may be provided. One or more embodiments may provide improved signal reliability relative to comparable conventional devices.

The output buffer 165 may store data that is filtered according to the recursive equalization by the first and second feed-forward filters 162a, 162b and the feedback filter 164. In the case of recursive equalization for a section, a final filtered section data may be stored in the output buffer 165. The output buffer 165 may provide the stored final filtered data to the TCM decoder 166. The TCM decoder 166 may provide the final filtered data to the de-interleaver 167.

The de-interleaver 167 may receive an output, e.g., the respective final filtered data, of TCM decoder 166 and may arrange the output in reverse order of an interleaved order by a transmitter (not shown). The convolutional code that is applied to a Viterbi algorithm may have a higher error correction ability when errors are scattered. However, error correction is not easy when errors occur on a particular symbol or a data intensively according to channel characteristic. For example, if burst error occurs, error correction is difficult because error is concentrated in a specific data field. Therefore, the transmitter (not shown) may scatter burst error that is generated on a channel to a symbol or a data column by interleaving. The de-interleaver 167 may rearrange the output of the TCM decoder 166 in reverse order of interleaved data by the transmitter. The rearranged data from the de-interleaver 167 may have a scattered error pattern even if burst error is included.

The RS decoder 168 may correct error in the de-interleaved data using, e.g., a Reed-Solomon code method. It is known that even typically uncorrectable error may be detected by long RS codes and/or a long RS decoder. The RS (207, 187, t=10) decoder may be used in ATSC VSB transmission system. More particularly, in such embodiments, e.g., a size of data block may be 187 bytes, and 20 RS additional bytes may be added for error correction. A total RS block of 207 bytes may be transmitted to each data segment.

Figure 3:
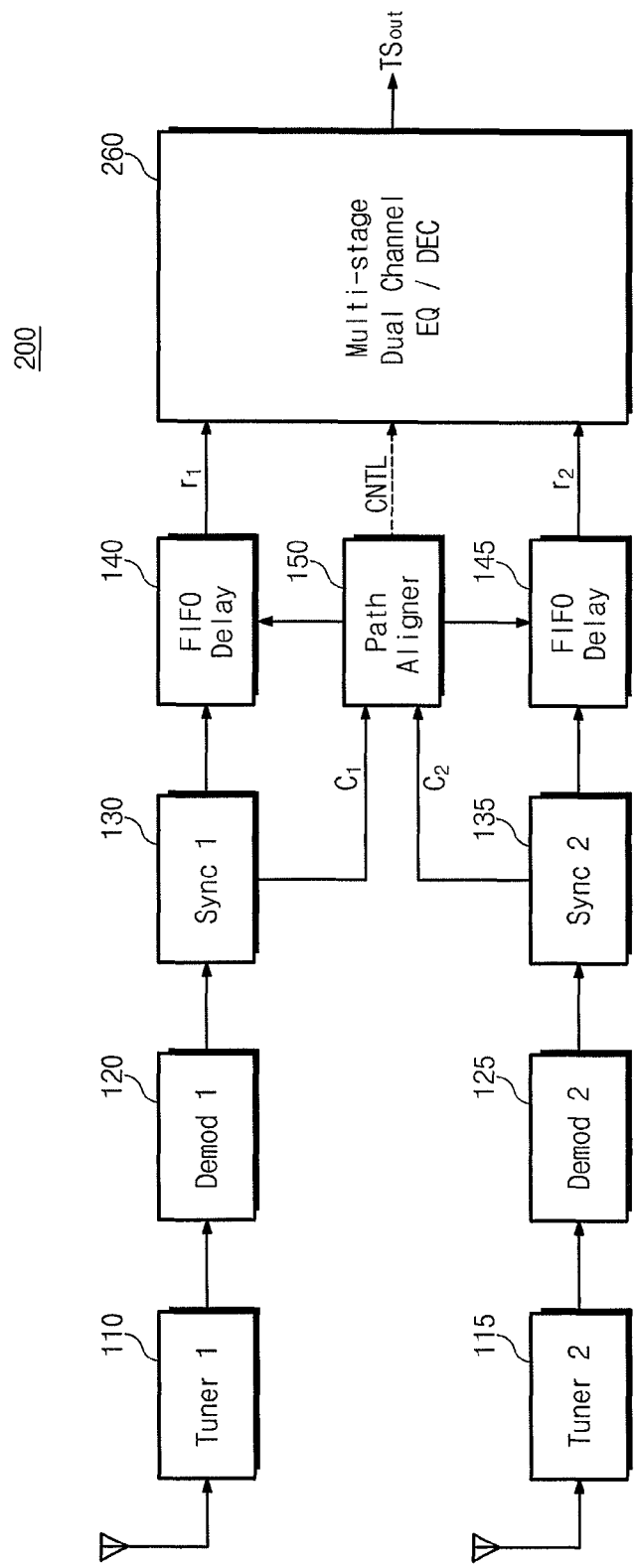
FIG. 3 illustrates a block diagram of another exemplary embodiment of a diversity receiver.

FIG. 3 illustrates a block diagram of another exemplary embodiment of a diversity receiver 200. In general, only differences between the exemplary diversity receiver 100 of FIG. 1 and the exemplary diversity receiver 200 of FIG. 2 will be described below.

Referring to FIG. 3, the diversity receiver 200 may include the first and second tuners 110, 115, the first and second demodulators 120, 125, the first and second synchronization units 130, 135, the first and second FIFOs 140, 145, the path aligner 150 and a multi-stage dual channel equalizer/decoder 260.

The function and/or configuration of the first and second tuners 110, 115, the first and second demodulators 120, 125, the first and second synchronization units 130, 135, the first and second FIFOs 140, 145, and the path aligner 150 may correspond to those described above with regard to the diversity receiver 100 of FIG. 1. Thus, detailed description may not be repeated below.

The multi-stage dual channel equalizer/decoder 260 may process multiple, e.g., two, VSB data r1, r2 according to a multi-stage equalization/decoding procedure. The multi-stage dual channel equalizer/decoder 260 may perform adaptive channel equalization, TCM decoding, and Reed-Solomon decoding for two VSB data r1, r2. For adaptive channel equalization, decision feedback equalizer (DFE) may be used. For TCM decoding and Reed-Solomon decoding, a TCM decoder and an RS decoder may be used, respectively. Generally, a compensation effect of Inter symbol Interference (ISI) in a decision feedback equalizer (DFE) may be mainly influenced by the reliability of a decision value of a TCM decoder. In addition, reliability of a TCM decoder may increase according to an existence or amount of reliability information, which is used in soft-decision computation.

In the multi-stage dual channel equalizer/decoder 260, reliability information which may be generated by an RS decoder may be provided to a TCM decoder to process diversity received signal. Therefore, a TCM decoder may determine data with high reliability. In addition, a TCM decoder may feedback a state metric (for example, optimal surviving path metric or branch metric) or decision value into a decision feedback equalizer (DFE). Decision feedback equalizer (DFE) may be provided equalizer initial value which is having a high accuracy. Thus, one or more embodiments of the multi-stage dual channel equalizer/decoder 260 may output data having a high reliability in a time-varying and multi-path channel environment.

Below, detailed exemplary structures of the multi-stage dual channel equalizer/decoder 260 will be explained. The multi-stage dual channel equalizer/decoder 260 may perform at least two steps of equalization and decoding procedures (TCM and RS decoding).

In a first equalization and decoding step, the multi-stage dual channel equalizer/decoder 260 may perform normal adaptive channel equalization operation, TCM decoding, and Reed-Solomon decoding for an incoming symbol, sequentially. The multi-stage dual channel equalizer/decoder 260 may interleave and dibitize the Reed-Solomon decoded data and may provide a corresponding dibit result, e.g., a pair of binary bits, as reliability information.

In a second equalization and decoding step, the multi-stage dual channel equalizer/decoder 260 may perform adaptive channel equalization operation and TCM decoding and Reed-Solomon decoding for a data column using a same process used for the first equalization and decoding step. In particular, after the second equalization and decoding step, the dibit, e.g.

pair of binary bits, generated by the previous decoding operation step may be used as reliability information. If the second equalization and decoding step is the last step, the multi-stage dual channel equalizer/decoder 260 may output the second channel equalization for a data column and transmit stream (TS stream), which may be generated after de-interleaving and RC decoding.

Figure 4A:
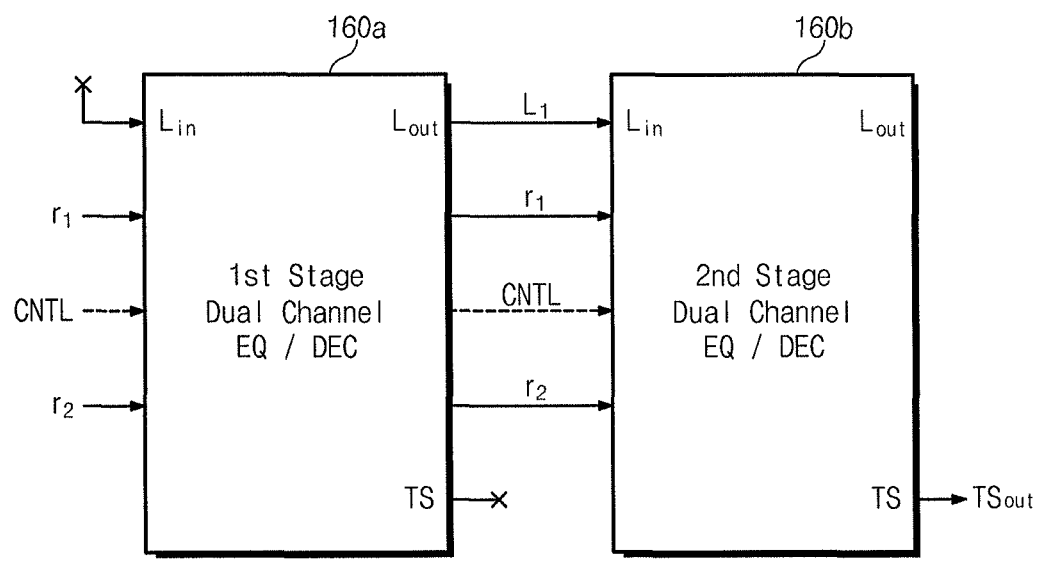
FIG. 4A to 4C illustrate block diagrams of exemplary embodiments of a multi-stage dual channel equalizer/decoder employable by the diversity receiver of FIG. 3.
Figure 4B:
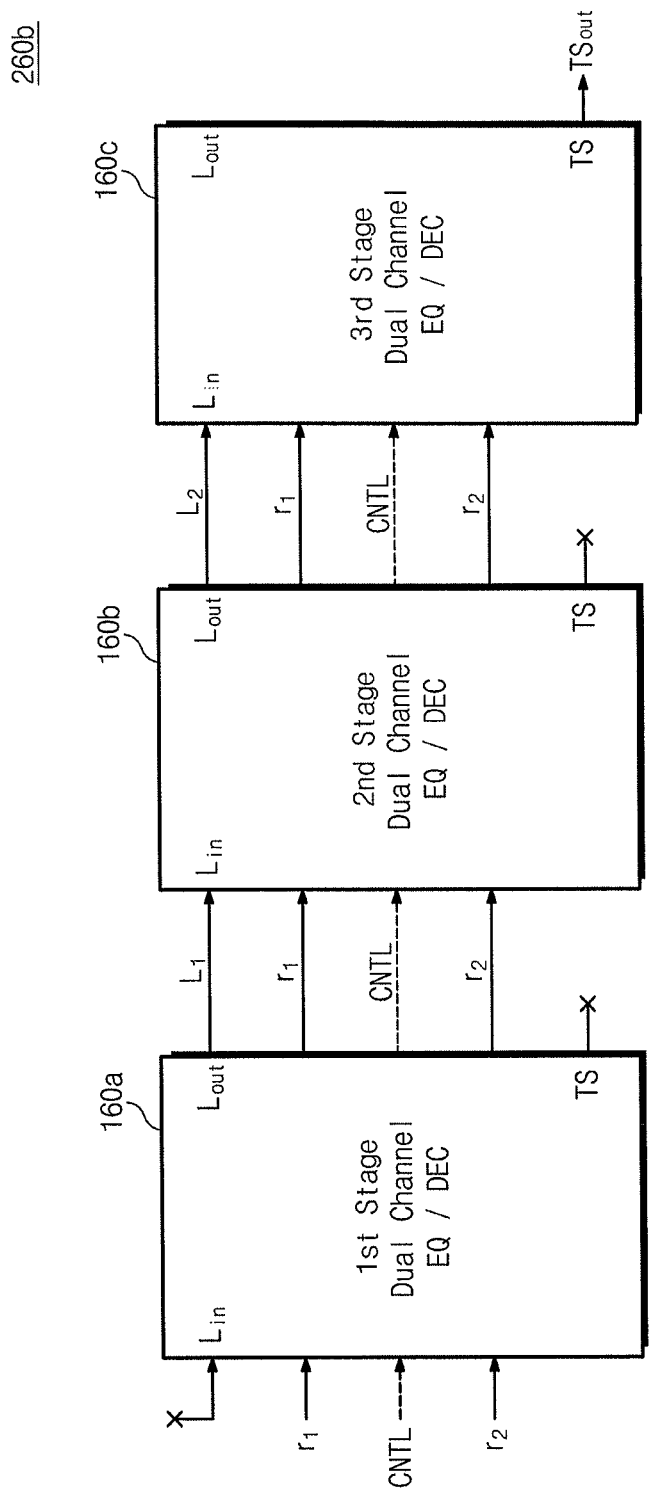
Figure 4C:
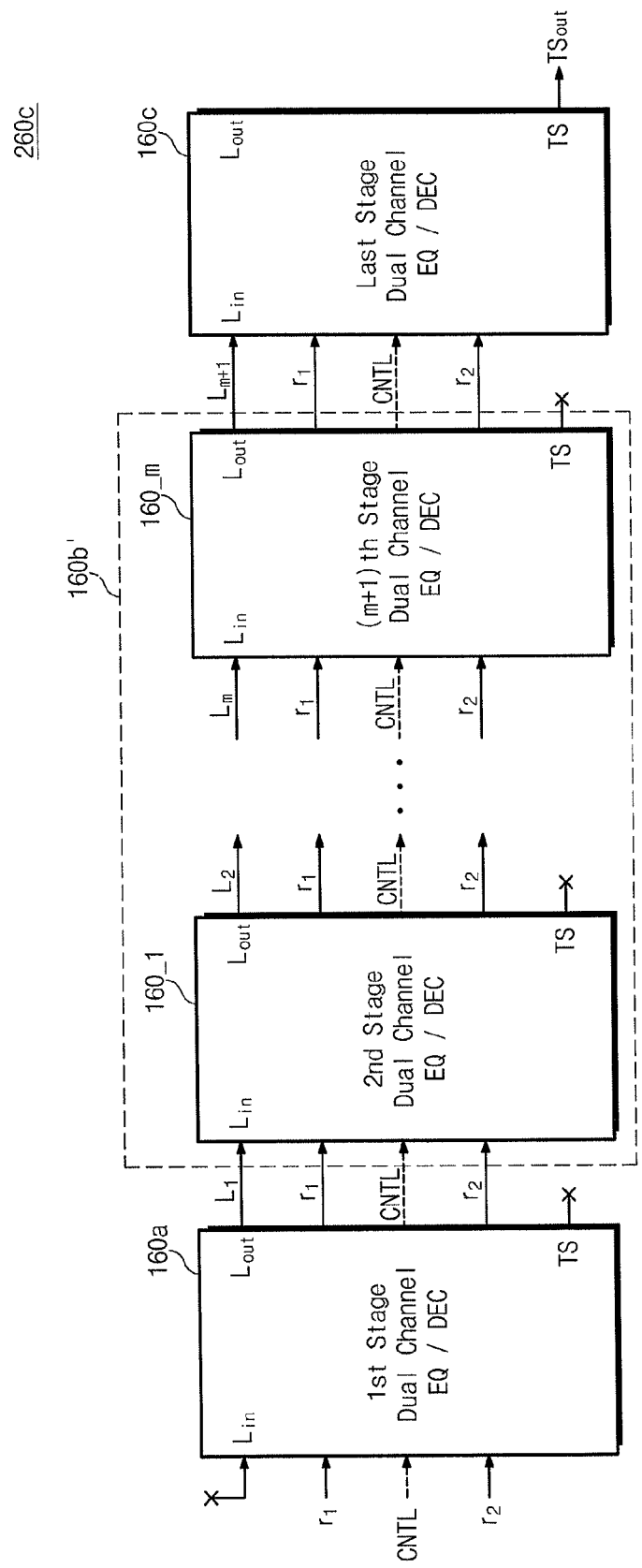
Figure 5:
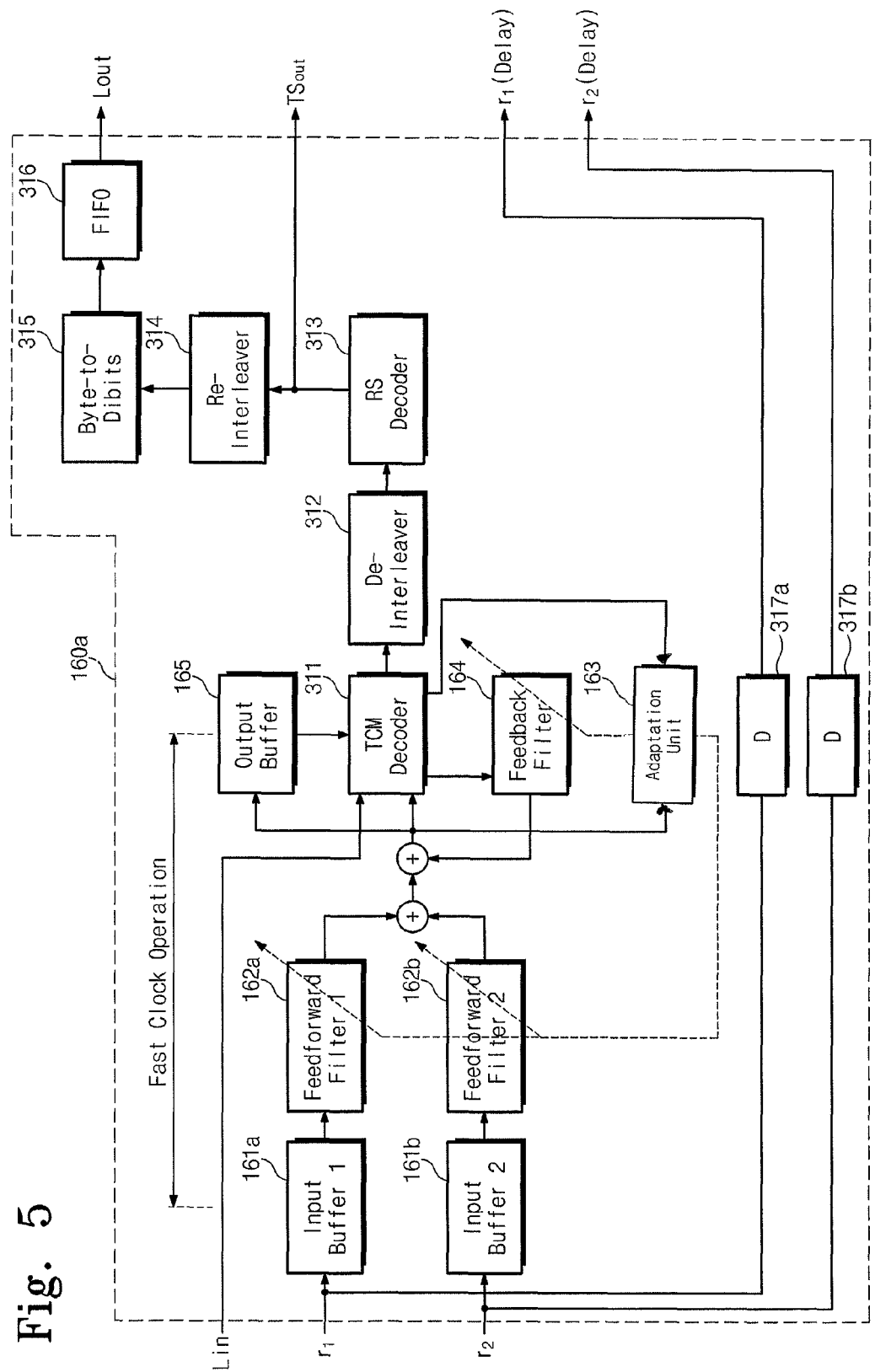
FIG. 5 illustrates a block diagram of an exemplary embodiment of a single dual channel equalizer/decoder employable by the multi-stage dual channel equalizer/decoders shown in FIG. 4A to 4C.

FIG. 4A to 4C illustrate block diagrams of exemplary embodiments of a multi-stage dual channel equalizer/decoder 260 employable by the diversity receiver 200 of FIG. 3. More particularly, FIG. 4A illustrates a block diagram of a two-stage dual channel equalizer/decoder 260a. FIG. 4B illustrates a block diagram of a three-stage dual channel equalizer/decoder 260b. FIG. 4C illustrates a block diagram of a multi-stage dual channel equalizer/decoder 260c. FIG. 5 illustrates a block diagram of an exemplary embodiment of a single dual channel equalizer/decoder 160n employable by the multi-stage dual channel equalizer/decoders 260a, 260b, 260c shown in FIG. 4A to 4C, respectively.

Referring to FIG. 4A, the two-stage dual channel equalizer/decoder 260a may include a first dual channel equalizer/decoder 160a, and a second dual channel equalizer/decoder 160b. In one or more embodiments, a configuration and/or operation characteristic of the first dual channel equalizer/decoder 160a and the second dual channel equalizer/decoder 160b may correspond to each other. Embodiments are not limited thereto. For example, in one or more embodiments, the first dual channel equalizer/decoder 160a and the second dual channel equalizer/decoder 160b may be configured to run different counts of recursive equalization, respectively.

Referring to FIGS. 3 and 4A, two aligned VSB data r1, r2 and a synchronization signal CNTL from the path aligner 150 may be provided to the first dual channel equalizer/decoder 160a. The first dual channel equalizer/decoder 160a may filter two respective VSB data r1, r2 using two feed-forward filters (see, e.g., 162a, 162b of FIG. 5). The first dual channel equalizer/decoder 160a may combine the filtered VSB data r1, r2 and may filter the combined signal by the feedback filter (see, e.g., 164 of FIG. 5). The filtered combined signal may correspond to a first transmit stream TS after TCM decoding, de-interleaving, and Reed-Solomon decoding (see, e.g., 311, 312, 313 of FIG. 5). In one or more embodiments, the first dual channel equalizer/decoder 160a may perform high speed recursive equalization using the feed-forward and the feedback filters (e.g., 162a, 162b, 164).

The first dual channel equalizer/decoder 160a may rearrange the first transmit stream TS by performing an interleaving operation (see, e.g., re-interleaver 314 of FIG. 5). The first dual channel equalizer/decoder 160a may transform the interleaved byte to dibit (see, e.g., Byte-to-Dibits 315). The first dual channel equalizer/decoder 160a may output the dibit as first reliability information L1. Referring to FIG. 4A, the first transmit stream TS may be provided to a transmit stream output TSout terminal thereof, but may not be provided to the second dual channel equalizer/decoder 160b.

The second dual channel equalizer/decoder 160b may receive the delayed VSB data r1, r2, which may be provided from the first dual channel equalizer/decoder 160a. The second dual channel equalizer/decoder 160b may receive the synchronization signal CNTL from the path aligner 150. The second dual channel equalizer/decoder 160b may receive reliability information L1 generated by the first dual channel equalizer/decoder 160a.

The second dual channel equalizer/decoder 160b may filter two respective VSB data r1 and r2 using two feed-forward filters (see, e.g., 162a, 162b of FIG. 5). The second dual channel equalizer/decoder 320 may combine the filtered VSB data r1, r2 and may filter the combined VSB data r1, r2 using a single feedback filter (see, e.g., 164 of FIG. 5). The filtered combined signal may be processed as a second transmit stream TS after TCM decoding, de-interleaving, and Reed-Solomon decoding (see, e.g., 311, 312, 313 of FIG. 5). The second dual channel equalizer/decoder 160b may perform high speed recursive equalization using the feed-forward and the feedback filters (e.g., 162a, 162b, 164).

Referring to FIG. 4A, the second dual channel equalizer/decoder 160b may process input VSB data r1, r2 according to a same procedure of the first dual channel equalizer/decoder 160a. The second dual channel equalizer/decoder 160b may perform TCM decoding using reliability information L1, which may be provided from the first dual channel equalizer/decoder 160a through input node Lin. The TCM decoded data may be rearranged in time domain using a normal de-interleaving procedure. The second dual channel equalizer/decoder 160b may generate a second transmit stream TS by executing second Reed-Solomon decoding for the respective de-interleaved data. The second dual channel equalizer/decoder 160b may output second transmit stream second TS stream as output signal TSout.

FIG. 4B illustrates a block diagram of the three-stage dual channel equalizer/decoder 260b. Referring to FIG. 4B, the three-stage dual channel equalizer/decoder 260b may include the first dual channel equalizer/decoder 160a, the second dual channel equalizer/decoder 160b and a third dual channel equalizer/decoder 160c. Each of dual channel equalizer/decoders 160a, 160b, 160c may perform a same or different recursive equalization operation.

Referring to FIGS. 3 and 4B, the two aligned VSB data r1 and r2 and the synchronization signal CNTL from the path aligner 150 may be provided to the first dual channel equalizer/decoder 160a. The first dual channel equalizer/decoder 160a may filter the two respective VSB data r1, r2 by using two feed-forward filters (see, e.g., 162a, 162b of FIG. 5). The first dual channel equalizer/decoder 160a may combine the filtered VSB data r1, r2 and may filter the combined signal using a single feedback filter (see, e.g., 164 of FIG. 5). The filtered combined signal may be processed as a second transmit stream TS after TCM decoding, de-interleaving, and Reed-Solomon decoding (see, e.g., 311, 312, 313 of FIG. 5). The first dual channel equalizer/decoder 160a may perform high speed recursive equalization using the feed-forward and the feedback filters (e.g., 162a, 162b, 164 of FIG. 5).

The first dual channel equalizer/decoder 160a may rearrange the first transmit stream TS by performing an interleaving operation (see, e.g., re-interleaver 314 of FIG. 5). The first dual channel equalizer/decoder 160a may transform the interleaved byte to dibit (see, e.g., Byte-to-Dibits 315). The first dual channel equalizer/decoder 160a may output the dibit as first reliability information L1. Referring to FIG. 4B, the first transmit stream TS may be provided to a transmit stream output TSout terminal thereof, but may not be provided to the second dual channel equalizer/decoder 160b.

Referring to FIG. 4B, the second dual channel equalizer/decoder 160b may process input VSB data r1, r2 according to a same procedure of the first dual channel equalizer/decoder 160a. The second dual channel equalizer/decoder 160b may perform TCM decoding using the first reliability information L1, which may be provided from the first dual channel equalizer/decoder 160a through an input node Lin thereof.

The second dual channel equalizer/decoder 160b may receive the delayed VSB data r1, r2 from the first dual channel equalizer/decoder 160a. The second dual channel equalizer/decoder 160b may receive the synchronization signal CNTL from the path aligner 150. The second dual channel equalizer/ decoder 160b may receive the first reliability information L1 generated by the first dual channel equalizer/decoder 160a.

The second dual channel equalizer/decoder 160b may filter the received VSB data r1, r2 using two feed-forward filters (see, e.g., 162a, 162b of FIG. 5). The second dual channel equalizer/decoder 160b may combine the filtered VSB data r1, r2 and may filter the combined VSB data r1, r2 using a single feedback filter (see, e.g., 164 of FIG. 5). The filtered combined signal may correspond to a second transmit stream TS according to TCM decoding, de-interleaving, and Reed-Solomon decoding (see, e.g., 311, 312, 313 of FIG. 5). In one or more embodiments, the second dual channel equalizer/decoder 160b may perform high speed recursive equalization using the feed-forward and the feedback filters (e.g., 162a, 162b, 164 of FIG. 5).

More particularly, the second dual channel equalizer/decoder 160a may process the VSB data r1, r2 input thereto in a same way as the first dual channel equalizer/decoder 160a. However, the second dual channel equalizer/decoder 160b may perform TCM decoding using reliability information L1 from first dual channel equalizer/decoder 160a through the input node Lin. The TCM decoded data may be rearranged in time domain using a normal de-interleaving procedure. The second dual channel equalizer/decoder 160b may generate second transmit stream TS by executing Reed-Solomon decoding for the respective de-interleaved data.

Furthermore, the second dual channel equalizer/decoder 160b may rearrange the second transmit stream TS using an interleaving operation (see, e.g., re-interleaver 314 of FIG. 5). The second dual channel equalizer/decoder 160b may transform the respective interleaved byte to dibit (see, e.g., Byte-to-Dibits 315). The second dual channel equalizer/decoder 160b may output the respective dibit as second reliability information L2.

Referring to FIG. 4C, the third dual channel equalizer/decoder 160c may receive the delayed VSB data r1, r2 from the second dual channel equalizer/decoder 160b. The third dual channel equalizer/decoder 160c may receive the synchronization signal CNTL from the path aligner 150. The third dual channel equalizer/decoder 160c may receive the reliability information L2 from the second dual channel equalizer/decoder 160b through an input node Lin thereof.

The third dual channel equalizer/decoder 160c may process the VSB data r1, r2 input thereto according to a same procedure as the first and/or the second dual channel equalizer/decoder 160a, 160b. However, the third dual channel equalizer/decoder 160c may perform TCM decoding using the second reliability information L2 from the second dual channel equalizer/decoder 160b through the input node Lin of the third dual channel equalizer/decoder 160c. The TCM decoded data may be rearranged in time domain using a normal de-interleaving procedure. The third dual channel equalizer/decoder 160c may generate a third transmit stream TS by executing Reed-Solomon decoding for the respective de-interleaved data. The third dual channel equalizer/decoder 160c may output the third transmit stream TS as an output signal TSout.

In one or more embodiments, the multi-stage dual channel equalizer/decoder 260 may employ dibit, e.g., 2 bits of binary data, as reliability information in order to improve accuracy of TCM decoding. The dibit may be generated using Reed-Solomon decoding. One or more embodiments may provide a multi-stage dual channel equalizer/decoder, e.g., 260, having improved accuracy relative to comparable conventional devices. One or more embodiments may provide a multi-stage dual channel equalizer/decoder, e.g., 260, which is configured to receive a result of TCM decoding, and has improved filtering performance relative to comparable conventional devices.

FIG. 4C illustrates a block diagram of an exemplary embodiment of a four or more stage dual channel equalizer/decoder 260c. In general, only differences between the exemplary embodiment 260c of FIG. 4C and the exemplary embodiments 260a, 260b described above will be described. The four or more stage dual channel equalizer 260c may substantially correspond to the dual channel equalizer 260b of FIG. 4B, including a multiple stage dual channel equalizer/decoder 160b' instead of the single stage dual channel equalizer/decoder 160b. More particularly, referring to FIG. 4C, in one or more embodiments, the multiple stage dual channel equalizer/decoder 160b' may include two or more dual channel equalizer/decoders, e.g., 160_1 to 160_m, where m is any integer equal to or greater than 2. Function and configuration of each of the dual channel equalizer/decoders 160a, 160_1 to 160_m, 160c may be similar and/or identical to one or more of the exemplary single dual channel equalizer/decoders 160, 160a, 160b, 160c described above. Thus, description about configuration and function of dual channel equalizer/decoder corresponding to each stage may not be repeated below.

FIG. 5 illustrates a block diagram of an exemplary embodiment of a single dual channel equalizer/decoder 160a employable in the multi-stage dual channel equalizer/decoder 260a, 260b, 260c of FIG. 4A to 4C, respectively. In FIG. 5, an exemplary configuration of the first stage dual channel equalizer/decoder 160a of FIGS. 4A to 4C is illustrated. However, one or more of the remaining ones of the dual channel equalizer/decoder, e.g., 160b, 160_1 to 160m, 160c, included in a multi-stage dual channel equalizer/decoder 260 may be similarly configured. In general, only differences between the exemplary first dual channel equalizer/decoder unit 160a of FIG. 5 and the exemplary dual channel equalizer/decoder 160 of FIG. 2 will be described below.

The first dual channel equalizer/decoder unit 160a may include the first and second input buffers 161a, 161b, the first and second feed-forward filters 162a, 162b, adaptation unit 163, the feedback filter 164, the output buffer 165, a TCM decoder 311, a de-interleaver 312, a RS decoder 313, a re-interleaves 314, a dibit generator 315, and a (first-in-first-out delay) FIFO 316. The first and second input buffers 161a, 161b, the first and second feed-forward filters 162a, 162b, the adaptation unit 163, the feedback filter 164, and the output buffer 165 may correspond to a recursive equalizer. Operation and/or configuration of such a recursive equalizer may be substantially identical to the recursive equalizer illustrated in and described above with regard to FIG. 2. Thus, detailed explanation will not be repeated below.

Referring to FIG. 5, the TCM decoder 311 may decode an output of the recursive equalizer according to a Trellis code decoding algorithm. Error may be corrected using a Trellis code decoding algorithm. The TCM decoder 311 may decode an input symbol using a decoding depth. If a decoding depth is large, a size of trace back may become larger. While data value accuracy may be improved as the size of trace back becomes larger, latency may increase.

Referring still to FIG. 5, the TCM decoder 311 may receive reliability information L, which may increase reliability of a soft-decision decoding operation (decoding operation that may provide a decision with an estimate of reliability). In one or more embodiments, the first dual channel equalizer/decoder unit 160a may receive input reliability information L externally input to the multi-stage dual channel equalizer/decoder, while other dual channel equalizer/decoder units, e.g., 160b, 160c, may receive respective dibits, e.g., $L_1$ through $L_{m+1}$, which may be generated during an earlier stage as reliability information. The TCM decoder 311 may increase branch metric by using the provided dibit.

The de-interleaver 312 may receive an output of TCM decoder 311. The de-interleaver 312 may arrange the output of TCM decoder 311 in a reverse way of the interleaving by the transmitter. In general, convolutional code applied to a Viterbi algorithm has higher error correction ability when errors are scattered. However, when errors occur on particular symbol or data according to channel characteristic, data recovery is not easy. For example, when burst error occurs, error correction is difficult because errors are concentrated in a specific data field. Therefore, the transmitter (not shown) may scatter burst error that is generated at a channel to a symbol or data column by interleaving operation. Therefore, the de-interleaver 312 may rearrange the output of TCM decoder 311 in a reverse way of the interleaving by the transmitter. The rearranged data by the de-interleaver 312 may have a scattered error pattern even if burst error is included.

The RS decoder 313 may correct error corresponding to data that is de-interleaved by a Reed-Solomon code method. Generally, uncorrectable error may be detected using a long RS decoder. For example, a RS (207, 187, t=10) decoder may be used in ATSC VSB transmission system, where a size of data block is 187 bytes, and 20 RS additional bytes are added for error correction such that a total RS block of 207 bytes size is transmitted to each data segment.

When a multi-stage equalizer/decoder is used, the RS decoder 313 may repeatedly perform error correction for a transmit stream. Even if error is not corrected in first stage, error may be corrected during further Reed-Solomon decoding process.

The re-interleaver 314, the dibit generator 315, and the FIFO 316 may be provided to process the transmit stream TSout, which is error-corrected by RS decoder 313, to provide reliability information Lout to a subsequent dual channel equalizer/decoder unit. The re-interleaver 314 may process an output of the RS decoder 313 according to an operation procedure that is identical to an operation procedure performed by transmitter. The dibit generator 315 may transform byte unit data to dibit of 2-bit units. The FIFO 316 may store and output the respective dibit according to FIFO processing.

An exemplary embodiment of the first dual channel equalizer/decoder unit 310 corresponding to a single stage has been described above. One or more of the dual channel equalizer/decoder units included in a multi-stage dual channel equalizer/decoder, e.g., 260, may be similar to the above-described first dual channel equalizer/decoder 160a. More particularly, e.g., a recursive count of a recursive equalizer may be configured differently for each stage.

Figure 6:
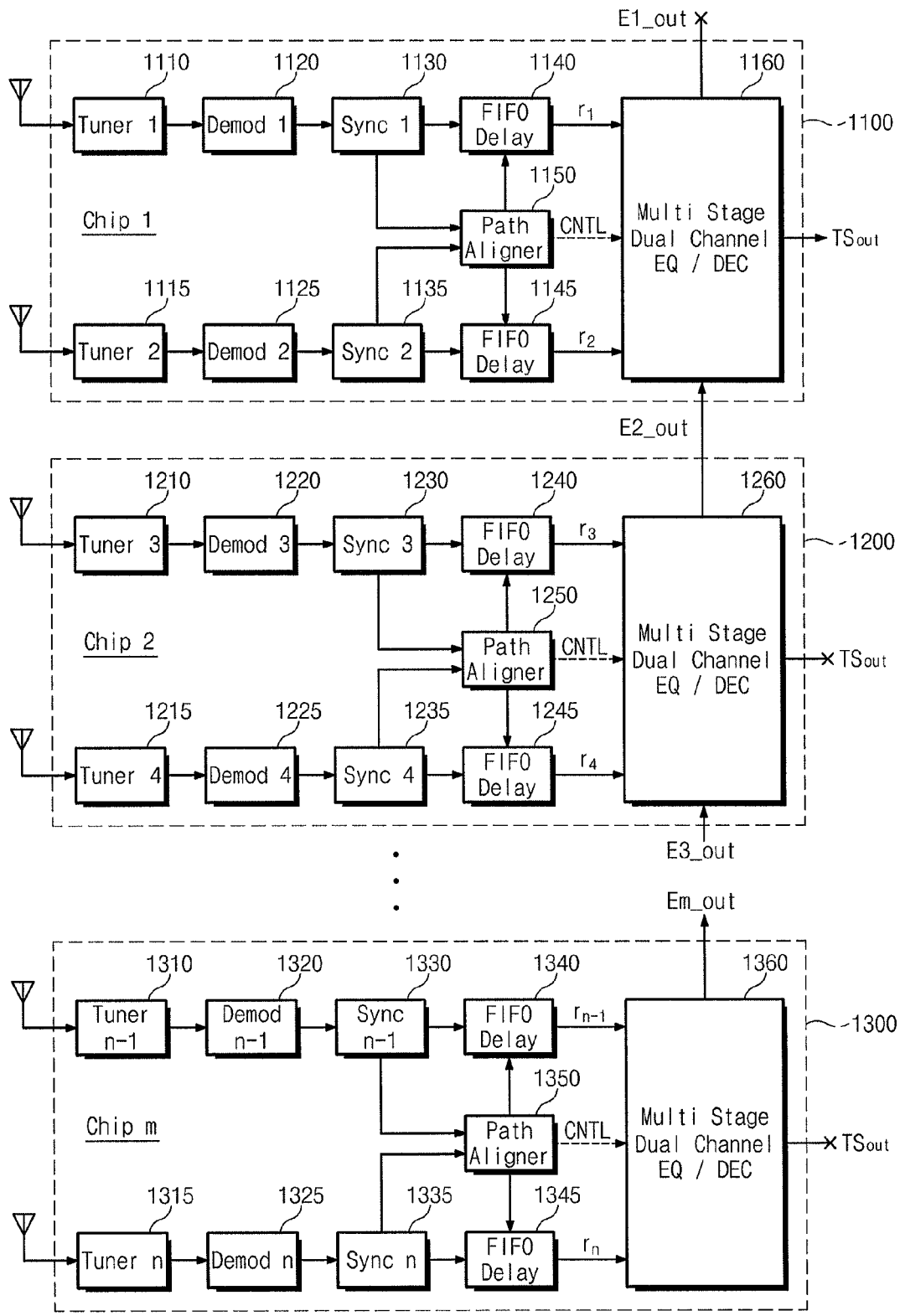
FIG. 6 illustrates a block diagram of an exemplary embodiment of a multi-channel diversity receiver including a plurality of multi-stage dual channel equalizer/decoders.

FIG. 6 illustrates a block diagram of an exemplary embodiment of a multi-channel diversity receiver 1000. The multi-channel diversity receiver 1000 may be an n-channel diversity receiver including m diversity receivers, e.g., 1100, 1200, 1300, each arranged on a respective one of a plurality of chips, e.g., m chips, where n=2m.

Each of the dual channel diversity receivers 1100, 1200, 1300 of FIG. 6 may correspond to the multi-stage dual channel equalizer/decoders, e.g., 260 of FIG. 3 arranged on a respective one of the m chips. Referring to FIG. 6, the dual channel diversity receivers 1100, 1200, 1300 may each include a respective one of a plurality of multi-stage dual channel equalizer/decoders 1160, 1260, 1360. Each of the multi stage dual channel equalizer/decoders 1160, 1260, 1360 arranged on a respective one of the m chips may generate chip pass signals E1_out, E2_out, . . . , Em_out. Each of chip pass signals E1_out, E2_out, . . . , Em_out may include channel state information CSI and a respective equalizer output signal EQ_out.

Referring to FIG. 6, each of the receiver chips 1100, 1200, 1300 may generate chip pass signals E1_out, E2_out, . . . , Em_out. Each of the chip pass signals E1_out, E2_out, . . . , Em_out may be generated by operation of the multi-stage dual channel equalizer/decoders 1100, 1200, 1300. The chip pass signals E1_out, E2_out, . . . , Em_out may be collected by the multi-stage dual channel equalizer/decoder 1160, 1260, 1360 included in the respective chip.

More particularly, e.g., the multi-stage dual channel equalizer/decoders 1160, 1260, 1360 may output an n-channel diversity reception signal as a respective transmit stream TSout corresponding to collected chip pass signals E1_out, E2_out, . . . , Em_out. Detailed explanation of an exemplary embodiment of each chip will be explained in detail below with regard to FIGS. 7A, 7B, and 8.

Figure 7A:
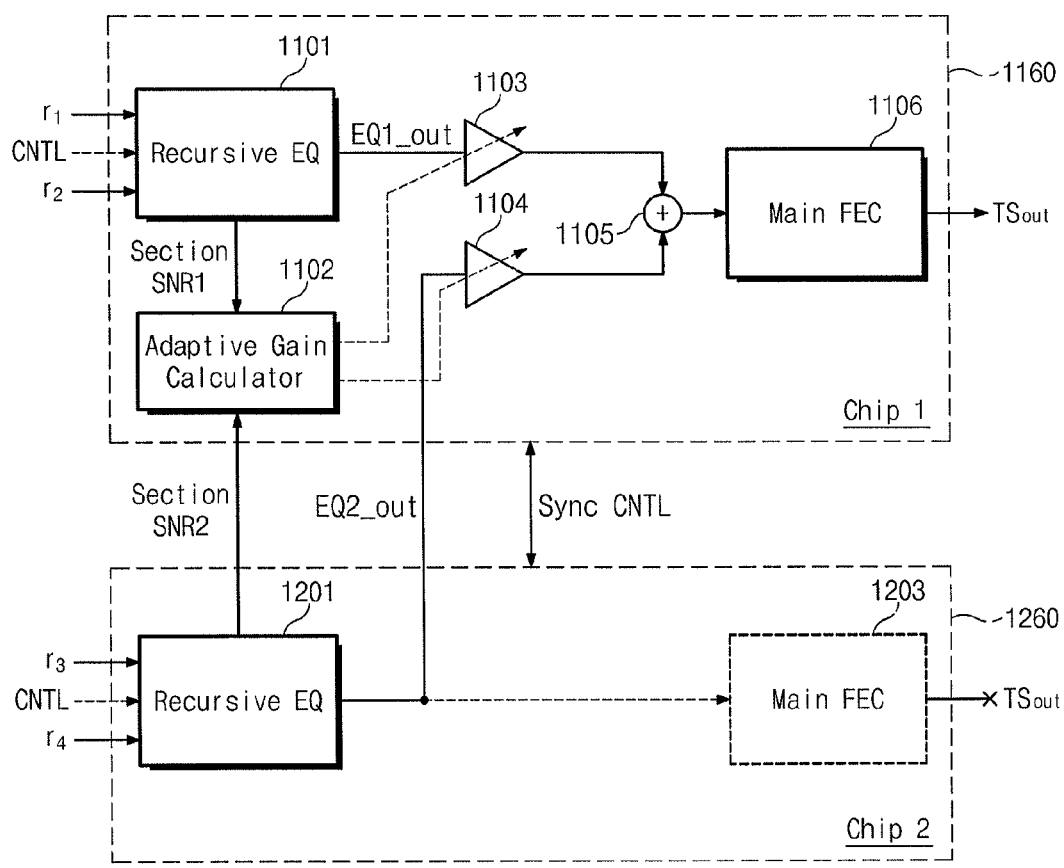
FIGS. 7A and 7B illustrate block diagrams of exemplary implementations for collecting equalizer output signal and channel state information from another chip.
Figure 7B:
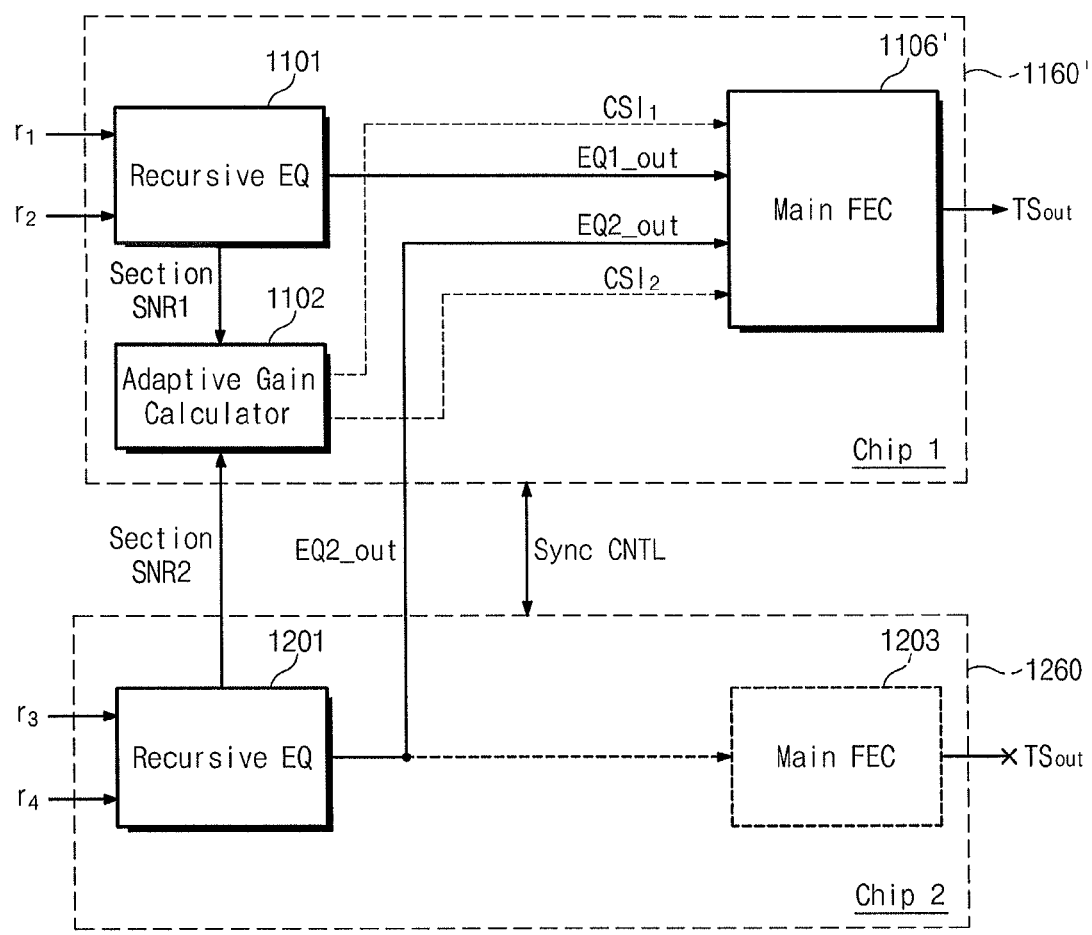

FIGS. 7A and 7B illustrate block diagrams of exemplary implementations for collecting equalizer output signal and channel state information CSI from another chip.

More particularly, FIG. 7A illustrates an exemplary configuration of multi-stage dual channel equalizer/decoders 1160, 1260 for a normal signal. In the following description, it is assumed that the multi-stage dual channel equalizer/decoder 1160 of first receiver chip 200_1 collects chip pass signals E1_out, E2_out that may be generated by the first chip 1100 and the second chip 1200, respectively.

Referring to FIG. 7A, the multi stage dual channel equalizer/decoder 1260 may include a recursive equalizer 1201 and a Main FEC (Main Forward-Error-Corrector) 1203. The recursive equalizer 1201 of the second chip 1200 may perform an equalization operation for data r3, r4 received through corresponding dual channels. The recursive equalizer 1201 may generate equalizer output EQ2_out based on an equalizer operation. In addition, the recursive equalizer 1201 may estimate a section signal to noise ratio Section SNR2 based on the equalizer operation. In such embodiments, the section signal to noise ratio Section SNR2 and equalizer output EQ2_out may correspond to the chip pass signal E2_out. The chip pass signal E2_out may be provided to the multi-stage dual channel equalizer/decoder 1160 of the first chip 1100. The Main FEC 1203 may include an error correction unit including, e.g., a TCM decoder, de-interleaver, and RS decoder. The Main FEC 1203 of the second chip 1200 may not be activated during the equalization operation of the data r3, r4 and/or generation of the equalizer output EQ2_out.

The multi-stage dual channel equalizer/decoder 1160 of the first chip 1100 may include a recursive equalizer 1101, an adaptive gain calculator 1102, amplifiers 1103, 1104, mixer 1105 and main FEC 1106. When the signal to noise ratio Section SNR2 and the equalizer output EQ2_out are provided from second chip 1200, the signal to noise ratio Section SNR2 may be provided to the adaptive gain calculator 1102. The adaptive gain calculator 1102 may receive a signal to noise ratio Section SNR1 from the recursive equalizer 1101. The recursive equalizer 1101 may perform a recursive equalization operation for data r1 and r2. The adaptive gain calculator 1102 may provide optimum gain to the output of the equalizer of each of the chips 1100, 1200, 1300, respectively. This operation may be implemented by the amplifiers 1103 and 1104.

Equalizer outputs, e.g., EQ1_out, EQ2_out, which may be provided optimum gain, may be added by the mixer unit 1105 of the section unit. Added outputs may be provided to the main FEC 1106. The Main FEC 1106 may include an error correction unit including, e.g., a TCM decoder, de-interleaver, and RS decoder. The Main FEC 1106 of the first chip 1100 may process provided data and output processed data as transmit stream TSout.

FIG. 7B illustrates an exemplary configuration of multi-stage dual channel equalizer/decoders 1160', 1260 for an 8-VSB mode signal. The multi-stage dual channel equalizer/decoder 1160' of first chip 1100 may collect the chip pass signals, e.g., E1_out, E2_out, generated from the first chip 1100 and the second chip 1200, respectively. The received signal of 8-VSB mode may be processed by applying channel status information as weight to a branch metric for each of the equalizer outputs EQ1_out, EQ2_out, . . . , of the chips 1100, 1200, 1300. More detailed explanation will follow.

Referring to FIG. 7B, the recursive equalizer 1201 of the second chip 1200 may perform an equalization operation for data r3 and r4 received through respective dual channels. The recursive equalizer 1201 may generate equalizer output EQ2_out based on an equalizer operation. In addition, the recursive equalizer 1201 may estimate the section signal to noise ratio Section SNR2 based on the equalizer operation. In such embodiments, the section signal to noise ratio Section SNR2 and equalizer output EQ2_out may correspond to the chip pass signal E2_out. The chip pass signal E2_out may be provided to the multi-stage dual channel equalizer/decoder 1160 of the first chip 1100. The Main FEC 1203 may include an error correction unit including, e.g., a TCM decoder, de-interleaver, and RS decoder. The Main FEC 1203 of the second chip 1200 may not be activated during the equalization operation of the data r3, r4 and/or generation of the equalizer output EQ2_out.

The multi-stage dual channel equalizer/decoder 1160' of the first chip 1100 may include the recursive equalizer 1101, an adaptive gain calculator 1102', and a main FEC 1106'. When the signal to noise ratio Section SNR2 and the equalizer output EQ2_out are provided from second chip 1200, the section signal to noise ratio Section SNR2 may be provided to the adaptive gain calculator 1102'. The adaptive gain calculator 1102' may receive the signal to noise ratio Section SNR1 from the recursive equalizer 1101. The recursive equalizer 1101 may perform recursive equalization operation for data r1 and r2. The adaptive gain calculator 1102' may generate channel status information CSI1, CSI2 by using respective section signal to noise ratio (Section SNR1, Section SNR2) of each chip, e.g., 1100, 1200, 1300.

The Main FEC 1106' may perform TCM decoding for the equalizer outputs EQ1_out, EQ2_out of each of the chips 1100, 1200, 1300. The main FEC 1106' may calculate a branch metric for each of the equalizer outputs EQ1_out, EQ2_out independently. Afterwards, the main FEC 1106' may combine TCM decoding result by applying channel state information CSI1, CSI2 as weight. More particularly, after TCM decoding, de-interleaving, and Reed-Solomon decoding (see, e.g., 311, 312, 313 of FIG. 5), the respective combined signal may be output as a transmit stream TS.

Figure 8:
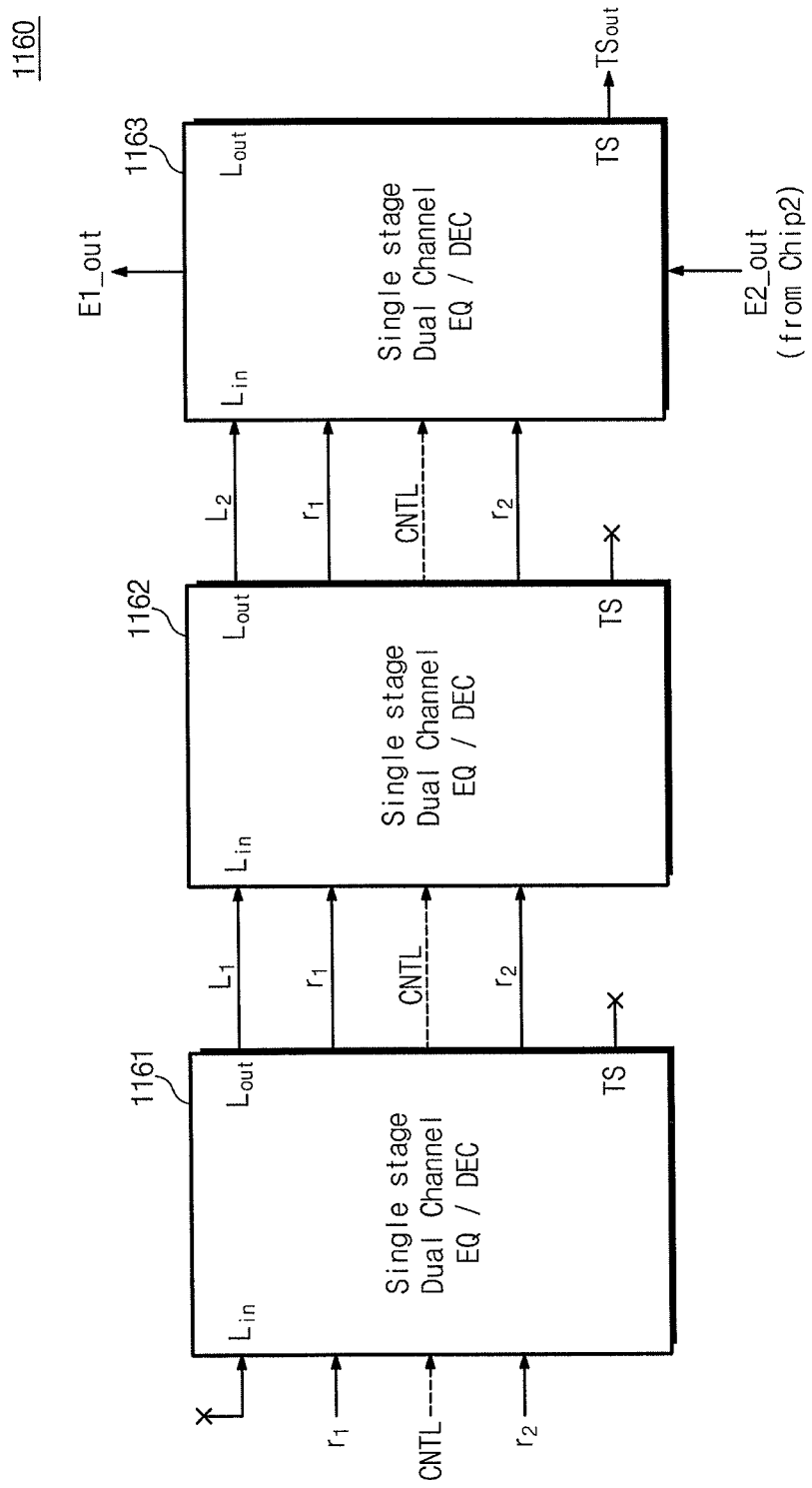
FIG. 8 illustrates a block diagram of an exemplary embodiment of a multi-stage dual channel equalizer/decoder corresponding to a chip shown in FIG. 6.

FIG. 8 illustrates a block diagram of an exemplary embodiment of a multi-stage dual channel equalizer/decoder 1160 employable by one or more of the chips 1100, 1200, 1300 shown in FIG. 6. Referring to FIG. 8, the multi-stage dual channel equalizer/decoder 1160 included in first chip 1100 shown in FIG. 6 is illustrated. More particularly, e.g., in one or more embodiments, the multi-stage dual channel equalizer/decoder 1260, 1360 of FIG. 6 may also include one or more features described with regard to the exemplary multi-stage dual channel equalizer/decoder 1160 of FIG. 8. The three-stage dual channel equalizer/decoder 1160 will be explained as an example. However, the embodiments are not limited thereto.

The multi-stage dual channel equalizer/decoder 1160 may include a first dual channel equalizer/decoder 1161, a second dual channel equalizer/decoder 1162, and a third dual channel equalizer/decoder 1163. Operation of the first and second dual channel equalizer/decoder 1161, 1162 for VSB data r1 and r2 may be substantially the same as the operation of the first and second dual channel equalizer/decoders 160a and 160b, respectively, shown in FIG. 4B. Thus, detailed description for function of first and second dual channel equalizer/decoders 1161 and 1162 may not be repeated below.

The third dual channel equalizer/decoder 1163 may receive a delayed VSB data r1, r2 and reliability information L2. The third dual channel equalizer/decoder 1163 may receive the second chip pass signal E2_out, which may be generated by the dual channel equalizer/decoder, of other chips, e.g., 1200, 1300 of FIG. 6. More particularly, e.g., the second chip pass signal E2_out may include the equalizer output EQ2_out of other chips and the section signal to noise ratio Section SNR2 corresponding to a section currently being processed.

More particularly, e.g., the third dual channel equalizer/decoder 1163 may generate the channel state information or the gain corresponding to the respective equalizer output, e.g., EQ_out2, which may be determined from the second chip pass signal E2_out and may combine each of the equalizer outputs, e.g., EQ2_out, EQ1_out. The combined equalizer outputs may be output as a respective transmit stream TSout of the diversity receiver, e.g., 1000 of FIG. 6.

As described above, the third dual channel equalizer/decoder 1163 corresponding to final stage may receive and transmit respective chip transmit signals, embodiments are not limited thereto. For example, the first dual channel equalizer/decoder and/or the second dual channel equalizer/decoder 1161, 1162 may also receive and process chip transmit signals of a corresponding stage from the other chips, e.g., 1200, 1300 of FIG. 6.

Figure 9:
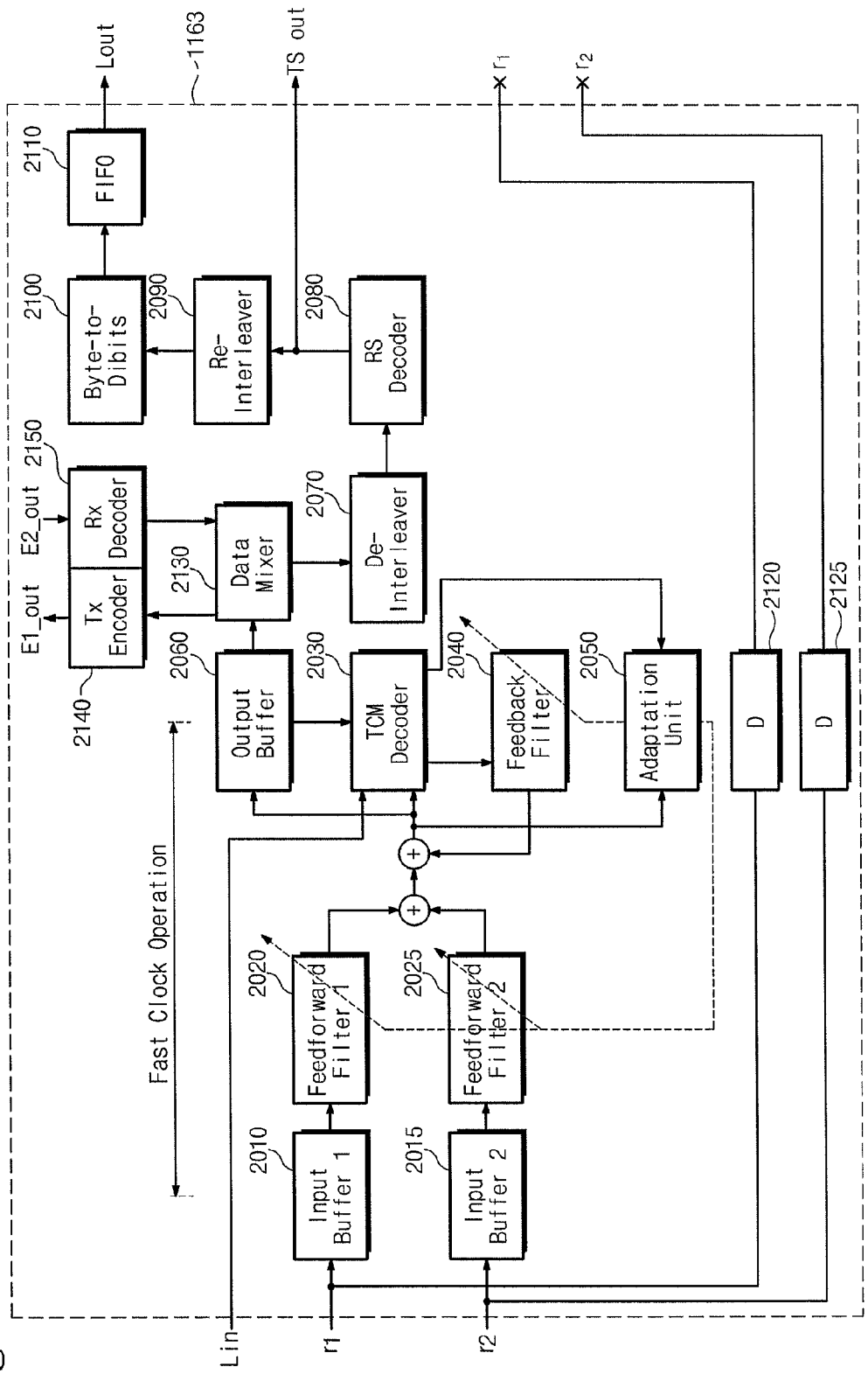
FIG. 9 illustrates a block diagram of an exemplary embodiment of a third dual channel equalizer/decoder employable by the equalizer/decoder shown in FIG. 8.

FIG. 9 illustrates a block diagram of an exemplary embodiment of the third dual channel equalizer/decoder 1163 shown in FIG. 8. Referring to FIG. 9, while an exemplary configuration of third dual channel equalizer/decoder 1163 is illustrated, one or more features described with each of first and second dual channel equalizer/decoders 1161 and 1162 may be identical to third dual channel equalizer/decoder 1163.

Third dual channel equalizer/decoder 1163 may include first and second input buffers 2010 and 2015, first and second feed-forward filters 2020 and 2025, adaptation unit 2050, feedback filter 2040, output buffer 2060, TCM decoder 2030, de-interleaver 2070, RS decoder 2080, re-interleaver 2090, dibit generator 2100, and FIFO 2110. The first and second input buffers 2010, 2015, the first and second feed-forward filters 2020, 2025, the adaptation unit 2050, the feedback filter 2040, and the output buffer 2060 may correspond to a recursive equalizer. Operation and/or configuration of such a recursive equalizer may be substantially identical to those of recursive equalizer described above and shown, e.g., in FIG. 5. Thus, detailed explanation may not be repeated below.

The TCM decoder 2030 may decode an output of the recursive equalizer according to a Trellis code decoding algorithm. Error may be corrected by the Trellis code decoding algorithm. The TCM decoder 2030 may decode an input symbol with a corresponding decoding depth. In general, when the decoding depth is large, a size of trace back becomes larger. As a size of trace back becomes larger, a data value may be determined more accurately.

The TCM decoder 2030 may receive reliability information Lin that may increase reliability of a soft-decision operation. In other words, data that is RS decoded by the second dual channel equalizer/decoder (1162) may be converted to dibit and may be provided as reliability information Lin. The TCM decoder 2030 may increase a branch metric based on the provided dibit.

The RS decoder 2080 may correct error of the data de-interleaved using a Reed-Solomon code method. It is known that even typically uncorrectable error may be detected by a long RS decoder. For example, a RS (207, 187, t=10) decoder may be used in ATSC VSB transmission system, where a size of data block is 187 bytes, and 20 RS additional bytes are added to error correction. The total RS block of 207 bytes size is transmitted to each data segment. When a multi-stage equalizer/decoder is used, the RS decoder 313 may repeatedly perform error correction for transmit stream. Even if error is not corrected in first stage, error may likely be corrected with further Reed-Solomon decoding.

The re-interleaver 2090, the dibit generator 2100 and the FIFO 2110 may be provided to process the transmit stream TSout, which is error-corrected by RS decoder 2080, to provide reliability information Lout to a subsequent dual channel equalizer/decoder unit. The re-interleaver 2090 may process an output of the RS decoder 2080 according to an operation procedure that is identical to an operation procedure performed by transmitter. The dibit generator 2100 may transform byte unit data to dibit of 2-bit units. The FIFO 2110 may store and output the respective dibit according to FIFO processing.

However, dual channel equalizer/decoder 1163 of final stage may not output reliability information. The dual channel equalizer/decoder 1163 of final stage may only output data that is generated as a result of operation of the RS decoder 2080 as transmit stream TSout.

Delays 2120 and 2125 delay VSB data r1 and r2 which is provided from former stage by delay amount corresponding to signal processing and output delayed VSB data r1 and r2. In final stage, output of VSB data r1 and r2 is not required.

Referring to FIG. 9, the third dual channel equalizer/decoder 1163 may further include a data mixer 2130, a transmission encoder 2140, a receiving decoder 2150. The data mixer 2130, the transmission encoder 2140 and the receiving decoder 2150 may operate to process the second chip pass signal E2_out from the second chip (e.g., 1200 of FIG. 6) and to output the first chip pass signal E1_out to be output to another chip. The respective section signal to noise ratio SNR from the output buffer 2060, or the equalizer output signal EQ_out should be sent to the other chip. However, data from output buffer 2060 may have disadvantages in transmission and receiving because a bit width of the data may be large. Therefore, in one or more embodiments, a transmission encoder 2140 may be used. The transmission encoder 2140 may convert a signal to noise ratio or equalizer output signal to the first chip pass signal E1_out having a reduced bit width by encoding. Or, e.g., the transmission encoder 2140 may convert clock frequency.

The receive decoder 2150 may perform opposite function of transmission encoder 2140. The receive decoder 2150 may decode received chip pass signal, e.g., E2_out, into a suitable form for data processing. The decoded second chip pass signal E2_out may be passed to the data mixer 2130.

The data mixer 2130 may synchronize and mix an output of the output buffer 2060 and the second chip pass signal E2_out. More particularly, the output of the output buffer 2060 may correspond to the first equalizer output EQ1_out and the second chip pass signal E2_out may correspond to the equalizer output of second chip EQ2_out. Mixing of the equalizer output of first chip EQ1_out and the equalizer output of second chip EQ2_out was described with regard to FIGS. 7A and 7B. The data mixer 2130 may provide the equalizer output of first chip EQ1_out that may be sent to a different chip and the section SNR to the transmission encoder 2140. Data that is applied may be mixed by the data mixer 2130 according to a gain or weight based on the equalizer output of each chip and passed to the de-interleaver 2070. Data may be output as transmit stream TSout that may be received in diversity method after it is processed by RS decoder 2080.

Exemplary configuration of the third dual channel equalizer/decoder 1163 configuring one stage was described above. One, some or all of the dual channel equalizer/decoder units included in a multi-stage dual channel equalizer/decoder unit, e.g., 200, may be identical to the exemplary first dual channel equalizer/decoder unit 310 described above. Embodiments are not limited thereto. For example, repetition of the recursive equalizer may be configured differently for each step.

The digital TV broadcasting system using the ATSC 8-VSB method was designed by considering a fixed Roof-Top antenna. Therefore, in HD broadcasting, the digital TV broadcasting system using the ATSC 8-VSB method is more advantageous than a DVB-T method which is used in Europe. On the other hand, a reception performance of a digital TV broadcasting system using the ATSC 8-VSB method in mobile environment is relatively degraded. Therefore, ATSC 8-VSB techniques have been developed to improve reception performance in mobile environment. To improve reception performance in mobile environment, some standards (DVB-H, MediaFLO, T-DMB, ATSC-M/H) have been proposed as an alternative.

A key technology to improve a performance of digital TV receiver in a mobile environment is an equalizer module. The equalizer module can compensate multi-path effect of a channel occurred in a mobile environment. The multi-path of the channel causes fast change of channel environment. To overcome multi-path effect, the equalizer is needed to adapt a parameter rapidly to a fast channel environment. In addition, in the mobile environment, a diversity reception method can be used to improve a performance of mobile reception of the ATSC 8-VSB because a reception performance improvement is expected by selecting a best single demodulation signal among received signals. However, it is not easy to apply a diversity reception method and a high performance equalizer module at the same time and effectively. As described above, one or more embodiments described herein may provide a diversity receiver receiving VSB signals including a high performance equalizer module that may increase reliability of received data in a multi-path and time-varying channel environment relative to conventional devices.

The above-disclosed subject matter is to be considered illustrative, and not restrictive, and the appended claims are intended to cover all such modifications, enhancements, and other embodiments, which fall within the true spirit and scope. Further, in some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Thus, to the maximum extent allowed by law, the scope is to be determined by the broadest permissible interpretation of the following claims and their equivalents, and shall not be restricted or limited by the foregoing detailed description.

What is claimed is:

1. A diversity receiver configured to receive VSB (vestigial sideband) signals, comprising:
   a first demodulator configured to receive a first VSB signal and demodulate the first VSB signal to first VSB data;
   a second demodulator configured to receive a second VSB signal and demodulate the second VSB signal to second VSB data;
   a path aligner configured to detect starting points of the first VSB data and the second VSB data and synchronizing the first VSB data and the second VSB data; and
   a dual channel equalizer/decoder configured to repeatedly perform an equalization process for a selected section, the equalization process including filtering each of the first and second VSB data synchronized in a feed-forward manner, mixing the first and second filtered VSB data, and filtering the mixed result in a decision feedback manner, wherein the dual channel equalizer/decoder includes:
   a TCM (trellis code modulation) decoder configured to decode a data stream generated by the equalization process into a Trellis code;
   a de-interleaver configured to de-interleave an output of the TCM decoder;
   a Reed-Solomon decoder configured to process the de-interleaved data stream by a Reed-Solomon algorithm and output the processed data stream as a transmit stream; and
   a recursive equalizer configured to filter each of the first VSB data and the second VSB data by a feed-forward method, mix the first filtered VSB data and the second filtered VSB data, and filter the mixed result by a feedback method, the recursive equalizer using the output of the TCM decoder as determination values for the feed-forward filtering and the feedback filtering.

2. The diversity receiver as claimed in claim 1, wherein the recursive equalizer includes:
   a first input buffer configured to store the first VSB data and output the first VSB data in a section unit;
   a second input buffer configured to store the second VSB data and output the second VSB data in the section unit;
   a first feed-forward filter configured to filter data of the section unit from the first input buffer according to an equalizer coefficient that is repeatedly updated;
   a second feed-forward filter configured to filter data of the section unit from the second input buffer according to the equalizer coefficient that is repeatedly updated;
   a first mixer configured to mix outputs of the first feed-forward filter and the second feed-forward filter;
   a feedback filter configured to filter the mixed signal by referring to a decision from the TCM decoder; and
   a coefficient adapting unit configured to adaptively update each equalizer coefficient of the first feed-forward filter, the second feed-forward filter, and the feedback filter by referring to the decision from the TCM decoder.

3. The diversity receiver as claimed in claim 2, wherein the recursive equalizer further includes an output buffer that is configured to temporarily store sections finally generated by a recursive filtering of the section, rearrange the temporarily stored sections to a data stream and provide the rearranged sections to the TCM decoder or the de-interleaver.

4. A diversity receiver configured to receive VSB (vestigial sideband) signals, comprising:
   a first demodulator configured to receive a first VSB signal and demodulate the first VSB signal to first VSB data;
   a second demodulator configured to receive a second VSB signal and demodulate the second VSB signal to second VSB data;
   a path aligner configured to detect starting points of the first VSB data and the second VSB data and synchronizing the first VSB data and the second VSB data; and
   a dual channel equalizer/decoder configured to repeatedly perform an equalization process for a selected section, the equalization process including filtering each of the first and second VSB data synchronized in a feed-forward manner, mixing the first and second filtered VSB data, and filtering the mixed result in a decision feedback manner, wherein the dual channel equalizer/decoder includes:
   a first dual channel equalizer/decoder configured to perform a first recursive equalization operation, a first TCM decoding, and a first Reed-Solomon decoding sequentially for each of the first VSB data and the second VSB data and to output a first Dibit as a result; and
   a second dual channel equalizer/decoder configured to perform a second recursive equalization operation, a second TCM decoding, and a second Reed-Solomon decoding for each of the first VSB data and the second VSB data and to output a transmit stream as a result,
   wherein the first Dibit is provided as a reliability information for a soft decision operation of the second TCM decoding operation.

5. The diversity receiver as claimed in claim 4, wherein the first dual channel equalizer/decoder includes:
   a first recursive equalizer configured to perform a first recursive equalization operation for each of the first VSB data and the second VSB data;
   a first TCM decoder configured to decode an output of the recursive equalizer by a Trellis code algorithm;
   a first de-interleaver configured to de-interleave an output of the first TCM decoder;
   a first Reed-Solomon decoder configured to perform a first Reed-Solomon decoding for an output of the first de-interleaver;
   a first interleaver configured to interleave an output of the first Reed-Solomon decoder; and
   a Dibit generator configured to convert a byte output of the first interleaver to the Dibit.

6. The diversity receiver as claimed in claim 5, wherein the first recursive equalizer includes:
   a first input buffer configured to store the first VSB data and to output the first VSB data in a section unit;
   a second input buffer configured to store the second VSB data and to output the second VSB data in the section unit;
   a first feed-forward filter configured to filter data of the section unit from the first input buffer according to an equalizer coefficient that is repeatedly updated;
   a second feed-forward filter configured to filter data of the section unit from the second input buffer according to the equalizer coefficient that is repeatedly updated;
   a first mixer configured to mix outputs of the first feed-forward filter and the second feed-forward filter;
   a feedback filter configured to filter the mixed signal by referring to a decision value from the TCM decoder; and
   a coefficient adapting unit configured to adaptively updating each equalizer coefficient of the first feed-forward filter, the second feed-forward filter, and the feedback filter by referring to the decision from the TCM decoder.

7. The diversity receiver as claimed in claim 6, wherein the feedback filter is configured with a decision feedback equalizer and a path metric or a decision value from the TCM decoder is fed back to the feedback filter.

8. The diversity receiver as claimed in claim 5, wherein the second dual channel equalizer/decoder includes:
- a second recursive equalizer configured to perform a second recursive equalization operation for each of the first VSB data and the second VSB data;
- a second TCM decoder configured to decode an output of the second recursive equalizer by a Trellis code algorithm by using the first Dibit as the reliability information;
- a second de-interleaver configured to de-interleave an output of the second TCM decoder; and
- a second Reed-Solomon decoder configured to perform the second Reed-Solomon decoding for an output of the second de-interleaver.

9. The diversity receiver as claimed in claim 4, further comprising:
- a third dual channel equalizer/decoder between the first dual channel equalizer/decoder and the second dual channel equalizer/decoder and configured to generate a third Dibit by performing a third recursive equalization operation for each of the first VSB data and the second VSB data, a third TCM decoding using the first Dibit as the reliability information, and a third Reed-Solomon decoding successively and to provide the third Dibit to the second dual channel equalizer/decoder.

10. The diversity receiver as claimed in claim 4, further comprising:
- a plurality of the dual channel equalizer/decoders between the first dual channel equalizer/decoder and the second dual channel equalizer/decoder and configured to respectively perform a recursive equalization operation for each of the first VSB data and the second VSB data, a TCM decoding, and Reed-Solomon decoding successively.

11. The diversity receiver as claimed in claim 10, wherein each of the plurality of dual channel equalizer/decoder is configured to provide a Dibit generated by Reed-Solomon decoding and a delayed receiving symbol to a following dual channel equalizer/decoder.

12. A diversity receiver configured to receive VSB (vestigial sideband) signals, comprising:
- a first equalizer/decoder configured to synchronize first diversity signals and generate a first signal to noise ratio and a first equalizer output by a recursive equalization operation in a section unit for the first diversity signals thus synchronized; and
- a second equalizer/decoder configured to synchronize second diversity signals, generate a second signal to noise ratio and a second equalizer output by a recursive equalization operation in a section unit for the second diversity signals thus synchronized, and mix the first equalizer output and the second equalizer output by referring to the first signal to noise ratio and the second signal to noise ratio,
wherein the second equalizer/decoder includes:
- a recursive equalizer configured to generate the second signal to noise ratio and the second equalizer output by processing the second diversity signals according to a recursive equalization operation procedure;
- an adaptive gain calculator configured to calculate a gain or a weight for the first equalizer output and the second equalizer output from the first signal to noise ratio and the second signal to noise ratio; and
- a main decoder configured to generate a transmit stream by combining the first equalizer output and the second equalizer output by referring to the gain or the weight for the first equalizer output and the second equalizer output.

13. The diversity receiver as claimed in claim 12, wherein the second equalizer/decoder further includes:
- a first amplifier configured to apply optimum gain to the first equalizer output;
- a second amplifier configured to apply optimum gain to the second equalizer output;
- a mixer configured to add the first equalizer output from the first amplifier and the second equalizer output from the second amplifier; and
- a main decoder configured to receive a result of the mixer and generate a transmit stream.

14. The diversity receiver as claimed in claim 13, wherein the main decoder includes a TCM decoder, a de-interleaver, and a Reed-Solomon decoder for processing the result of the mixer and generate the transmit stream.

15. A diversity receiver configured to receive digital signals, comprising:
- a first demodulator configured to receive a first signal and demodulate the first signal to first data;
- a second demodulator configured to receive a second signal and demodulate the second signal to second data;
- a path aligner configured to detect starting points of the first data and the second data and generate a control signal for synchronizing the first data and the second data; and
- an equalizer/decoder configured to synchronize the first and second data and to generate a signal to noise ratio and an equalizer output by a recursive equalization operation for the diversity signals thus synchronized, wherein the equalizer/decoder includes:
  - a first-stage multi-channel equalizer/decoder configured to perform a first recursive equalization operation, a first TCM decoding, and a first Reed-Solomon decoding sequentially for each of the first data and the second data and to output a first result; and
  - a last-stage multi-channel equalizer/decoder configured to perform a last-stage recursive equalization operation, a last-stage TCM decoding, and a last-stage Reed-Solomon decoding for each of the first data and the second data and to output a transmit stream as a result,
wherein the first result is provided as a reliability information for a soft decision operation of the last-stage TCM decoding operation.

16. The diversity receiver as claimed in claim 12, wherein the first equalizer/decoder and the second equalizer/decoder are formed on different chips.

* * * * *